United States Patent
Elmieh et al.

(10) Patent No.: US 11,070,792 B1
(45) Date of Patent: Jul. 20, 2021

(54) SURFACE SELECTION FOR PROJECTION-BASED AUGMENTED REALITY SYSTEM

(71) Applicant: Facebook, Inc., Menlo Park, CA (US)

(72) Inventors: Baback Elmieh, Palo Alto, CA (US); Joyce Hsu, Oakland, CA (US); Scott Snibbe, Berkeley, CA (US); Amir Mesguich Havilio, San Francisco, CA (US); Angela Chang, Sunnyvale, CA (US); Alexandre Jais, Emeryville, CA (US); Rex Crossen, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 72 days.

(21) Appl. No.: 16/236,322

(22) Filed: Dec. 28, 2018

(51) Int. Cl.
| | |
|---|---|
| *H04N 13/302* | (2018.01) |
| *G06T 19/00* | (2011.01) |
| *H04N 13/363* | (2018.01) |
| *G06Q 50/00* | (2012.01) |
| *H04N 13/388* | (2018.01) |

(52) U.S. Cl.
CPC ........... *H04N 13/302* (2018.05); *G06Q 50/01* (2013.01); *G06T 19/006* (2013.01); *H04N 13/363* (2018.05); *H04N 13/388* (2018.05)

(58) Field of Classification Search
CPC ... H04N 13/302; H04N 13/363; H04N 13/388
USPC .......................................................... 348/41
See application file for complete search history.

(56) References Cited

U.S. PATENT DOCUMENTS

| | | | | |
|---|---|---|---|---|
| 2015/0241959 | A1* | 8/2015 | Abovitz | A61B 34/10 345/633 |
| 2015/0316980 | A1* | 11/2015 | Miller | G06F 3/005 345/419 |
| 2016/0049052 | A1* | 2/2016 | Cheatham, III | H04W 4/029 348/14.16 |

* cited by examiner

*Primary Examiner* — Amir Shahnami
(74) *Attorney, Agent, or Firm* — Baker Botts L.L.P.

(57) ABSTRACT

A method includes retrieving a media content item for display to a user in an environment. The method includes receiving, from one or more interaction devices each including a projector and a camera, one or more media objects captured by one or more cameras, where one or more of the media objects include images of the user, and determining a location of the user in the environment based on an analysis of the one or more of the media objects. The method also includes identifying one of the interaction devices based on the determined location of the user and sending, to the identified interaction device, the media content item and instructions causing the projector associated with the identified interaction device to project the media content item.

20 Claims, 17 Drawing Sheets

SURFACE SELECTION FOR PROJECTION-BASED AUGMENTED REALITY SYSTEM

TECHNICAL FIELD

This disclosure generally relates to hardware and software enabling augmented-reality experience.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include information that the user has entered. The information may be public or private, depending on the user's privacy settings, and may include communication-channel information, and information on personal interests of the user. The social-networking system may also, with input and permission from a user, provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a projection-based augmented-reality system may provide a hardware and software platform enabling ambient and in-the-world augmented-reality experience. The system may access user information in accordance with privacy settings specified by the system's owner and each user that comes within the visual field of the system. For example, the owner of the augmented-reality system may specify that under no circumstances may the system access information about anyone that is stored by the social-networking system. In this scenario, the system would not communicate with remote servers with regard to any type of user information. As another example, the owner of the augmented-reality system may specify that the system may access information stored by the social-networking system to enhance the user's experience (as will be discussed below). In this scenario, the augmented-reality may communicate with the social-networking system with regard to the owner's social-networking data, but the system will continue to check for permission to access other user's social-networking data. For example, if the owner has opted into social-networking data access, but the owner's friend has not opted in, the system will not access the friend's social-networking data.

The augmented-reality system may comprise a plurality of interaction devices each comprising one or more visual or audio output devices, one or more sensor devices, and one or more controller modules configured to mechanically control positions and orientations of the components devices. The interactions devices may have various form factors and configurations. The augmented-reality system for a particular environment may comprise a central controller device that is connected to one or more external systems and is configured to, subject to privacy settings from all relevant users, analyze information collected by the interaction devices, to relay data between the interaction devices and external systems, and to coordinate the activities of the interaction devices. The augmented-reality system may model the objects and projectable surfaces in an indoor environment, track and detect locations and activities of users, project for display to users appropriate content that is adapted to the indoor environment at appropriate locations, and dynamically update content projected for display to the user based on data collected by sensor devices.

In particular embodiments, the augmented-reality system may construct a model of an environment, retrieve media content items for display to a user, select a surface for projection, adaptively project the media content item on the selected surface. The augmented-reality system may periodically or dynamically scan the environment for movements of projectable surfaces and users as well as gestures or vocal instructions by the users. If such activities are detected, the augmented reality system may update the model of the environment or update the content that is part of the augmented-reality experience of the user. Particular embodiments take advantage of free and projectable surfaces of common indoor objects to provide users seamless and in-the-world experience interacting with online content and services and virtual objects and information. Subject to the privacy settings of all relevant users, particular embodiments leverage data accessible via a social-networking system to customize the augmented-reality experience to individual users and to allow users to have a face-to-face experience communicating with social connections. For the purposes of this disclosure, a user is a relevant user if the augmented-reality system triggers a retrieval of information about that user from a remote server. A user is also a relevant user if the augmented-reality system captures and sends visual or aural data about the user to a remote server. If either of these conditions is met (i.e., retrieval of information about a user, or uploading visual or aural data about a user), the augmented-reality system will first access the user's privacy settings to determine whether the user has expressly granted the augmented-reality system access to the user's data.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
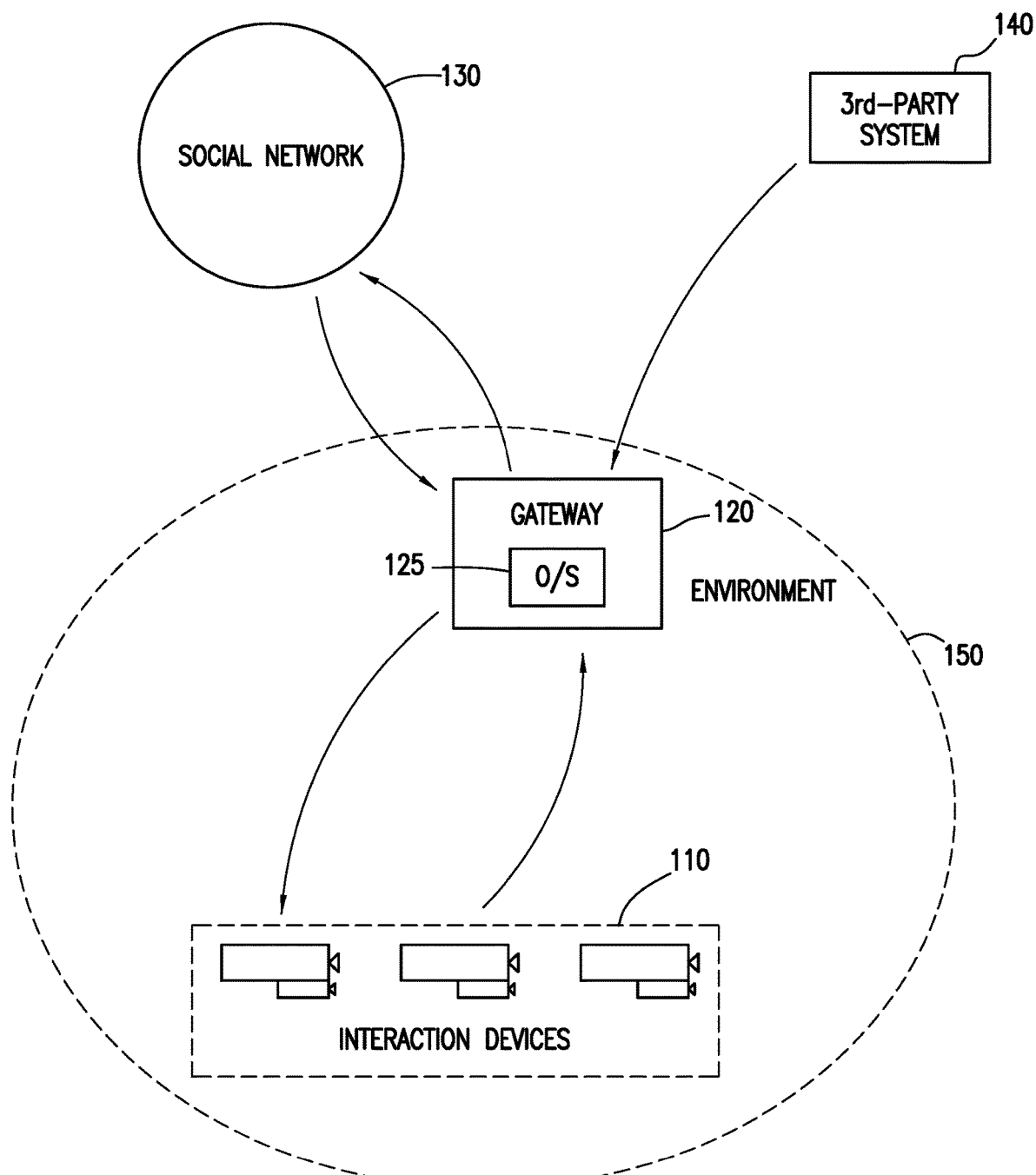
FIG. 1A illustrates an example network environment for providing augmented-reality experience.

In particular embodiments, a projection-based augmented-reality system may provide a hardware and software platform enabling ambient and in-the-world augmented-reality experience. The system may access user information in accordance with privacy settings specified by the system's owner and each user that comes within the visual field of the system. For example, the owner of the augmented-reality system may specify that under no circumstances may the system access information about anyone that is stored by the social-networking system. In this scenario, the system would not communicate with remote servers with regard to any type of user information. As another example, the owner of the augmented-reality system may specify that the system may access information stored by the social-networking system to enhance the user's experience (as will be discussed below). In this scenario, the augmented-reality may communicate with the social-networking system with regard to the owner's social-networking data, but the system will continue to check for permission to access other user's social-networking data. For example, if the owner has opted into social-networking data access, but the owner's friend has not opted in, the system will not access the friend's social-networking data.

The augmented-reality system may comprise a plurality of interaction devices each comprising one or more visual or audio output devices, one or more sensor devices, and one or more controller modules configured to mechanically control positions and orientations of the components devices. The interactions devices may have various form factors and configurations. The augmented-reality system for a particular environment may comprise a central controller device that is connected to one or more external systems and is configured to, subject to privacy settings from all relevant users, analyze information collected by the interaction devices, to relay data between the interaction devices and external systems, and to coordinate the activities of the interaction devices. The augmented-reality system may model the objects and projectable surfaces in an indoor environment, track and detect locations and activities of users, project for display to users appropriate content that is adapted to the indoor environment at appropriate locations, and dynamically update content projected for display to the user based on data collected by sensor devices.

In particular embodiments, the augmented-reality system may construct a model of an environment, retrieve media content items for display to a user, select a surface for projection, adaptively project the media content item on the selected surface. The augmented-reality system may periodically or dynamically scan the environment for movements of projectable surfaces and users as well as gestures or vocal instructions by the users. If such activities are detected, the augmented reality system may update the model of the environment or update the content that is part of the augmented-reality experience of the user. Particular embodiments take advantage of free and projectable surfaces of common indoor objects to provide users seamless and in-the-world experience interacting with online content and services and virtual objects and information. Subject to the privacy settings of all relevant users, particular embodiments leverage data accessible via a social-networking system to customize the augmented-reality experience to individual users and to allow users to have a face-to-face experience communicating with social connections.

FIG. 1A illustrates an example network environment for providing augmented-reality experience. In particular embodiments, the network environment may comprise one or more interaction devices 110. The interaction devices 110 may be installed at different areas of an indoor or outdoor environment 150. Each interaction device 110 may comprise one or more audio/video sensor or output devices. In particular embodiments, each interaction device 110 may comprise an assembly of one or more projectors, one or more cameras, one or more speakers, one or more microphones, one or more other devices, or any combination thereof. The interaction device 110 may further comprise a mechanical structure comprising one or more components connected by movable joints. The devices (e.g., projector) that are part of the interaction device 110 may each be attached to at least one component of the mechanical structure. The interaction device 110 may also comprise a controller module. The controller module may also be attached to at least one component of the mechanical structure. The mechanical structure of an interaction device 110 may be integrated with an element of the environment 150. For example, the mechanical structure may be attached to a fixture of an indoor environment or be integrated with a tangible object in the indoor environment.

In particular embodiments, the controller module may control one or more components of an interaction device 110. As an example and not by way of limitations, the controller module may control at least an orientation of the projector by controlling one or more of the movable joints of the mechanical structure. Similarly, the controller module may adjust or modify the positioning or orientation of one or more other components through the mechanical structure. In particular embodiments, the interaction device 110 may further comprise one or more optical instruments (e.g., mirrors, lenses) attached to the mechanical structure. The output of the projector of the interaction device 110 may be reflected by, refracted by, or pass through one or more of the optical instruments. The camera of the interaction device 110 may capture light from one or more of the optical instruments. The controller module may further control a position or orientation of an optical instrument via the mechanical structure. In this manner, the controller module may control, for example, a direction of projection or an area visible to a camera. In particular embodiments, the controller module may further control one or more optical properties of an output of the projector.

In particular embodiments, an interaction device 110 may be configured to perform a plurality of functionalities. As an example and not by way of limitation, an interaction device 110 may perform user detection using a combination of wide-angle camera and one or more detail-capturing cameras. As another example and not by way of limitation, one or more interaction devices 110 may perform multi-projection based on the detected location of a user. The interaction devices 110 may also track the movement of users using the cameras.

In particular embodiments, the controller module of an interaction device 110 may comprise one or more I/O devices coupled to one or more networks. In particular embodiments, the interaction device 110 may be connected to a gateway computing device 120 through one or more of the networks. The gateway computing device 120 may be configured to receive data gathered by one or more input devices (e.g., camera, microphone) associated with each of the interaction device 110. The gateway computing device 120 may further be configured to send, to each of the interaction devices 110, instructions for controlling the output devices (e.g., projector, speaker) associated with the interaction device 110. The gateway computing device 120 may be connected to one or more external systems. In particular embodiments, the gateway computing device 120 may be connected to a social-networking system 130. The gateway computing device 120 may relay data between the social-networking system 130 and the one or more interaction devices 110. For example, the gateway computing device 120 may send data gathered by the interaction devices 110 to the social-networking system 130 to the extend allowed by the relevant users or receive media content items or instructions as to how the media content items shall be displayed from the social-networking system 130 and relay such content or instructions to one or more of the interaction devices 110. In particular embodiments, the gateway computing device 120 may further be connected to one or more third-party server systems 140. The third-party systems 140 may correspond to, for example, content providers, application developers, other suitable entities or individuals, or any combination thereof. The gateway computing device 120 may similarly relay information between such third-party systems 140 and the interaction devices 110.

In particular embodiments, the gateway computing device 120 may or may not be necessary as part of the network environment illustrated by FIG. 1A. The controller module of an interaction device 110 may directly communicate with the social-networking system 130 or one or more third party systems 140. For example, the controller module of an interaction device 110 may send data gathered by one or more its sensing devices (e.g., camera) to one or more external systems to the extend allowed by the relevant users or receive content or instructions as to how to control one or more components (e.g., projector) of the interaction device 110 from one or more of the external systems. The controller module may thereby control one or more of the movable joints of the mechanical structure based on the received instructions to adjust at least the position or orientation of one or more of the components.

In particular embodiments, the gateway computing device may comprise software corresponding to an operating system 125. The operating system 125 may be configured to control one or more interaction devices. In particular embodiments, the operating system 125 may provide a layer of abstraction allowing third-party developers to program applications compatible with the augmented-reality platform without needing to know the specific environment (e.g., room layout, objects, surfaces) of each instance of application. The operating system 125 may only require, as input from a third-party developed program running on the augmented-reality platform, information such as content for display and the location for display (e.g., a particular surface, world locked, following a user if permitted by the user). The operating system 125 may handle rendering images for projection and adapting projection based on dynamically-sensed surfaces. Although FIG. 1A illustrates a particular network environment for providing augmented-reality experience, this disclosure contemplates any suitable network environment for providing augmented-reality experience.

Figure 1B:
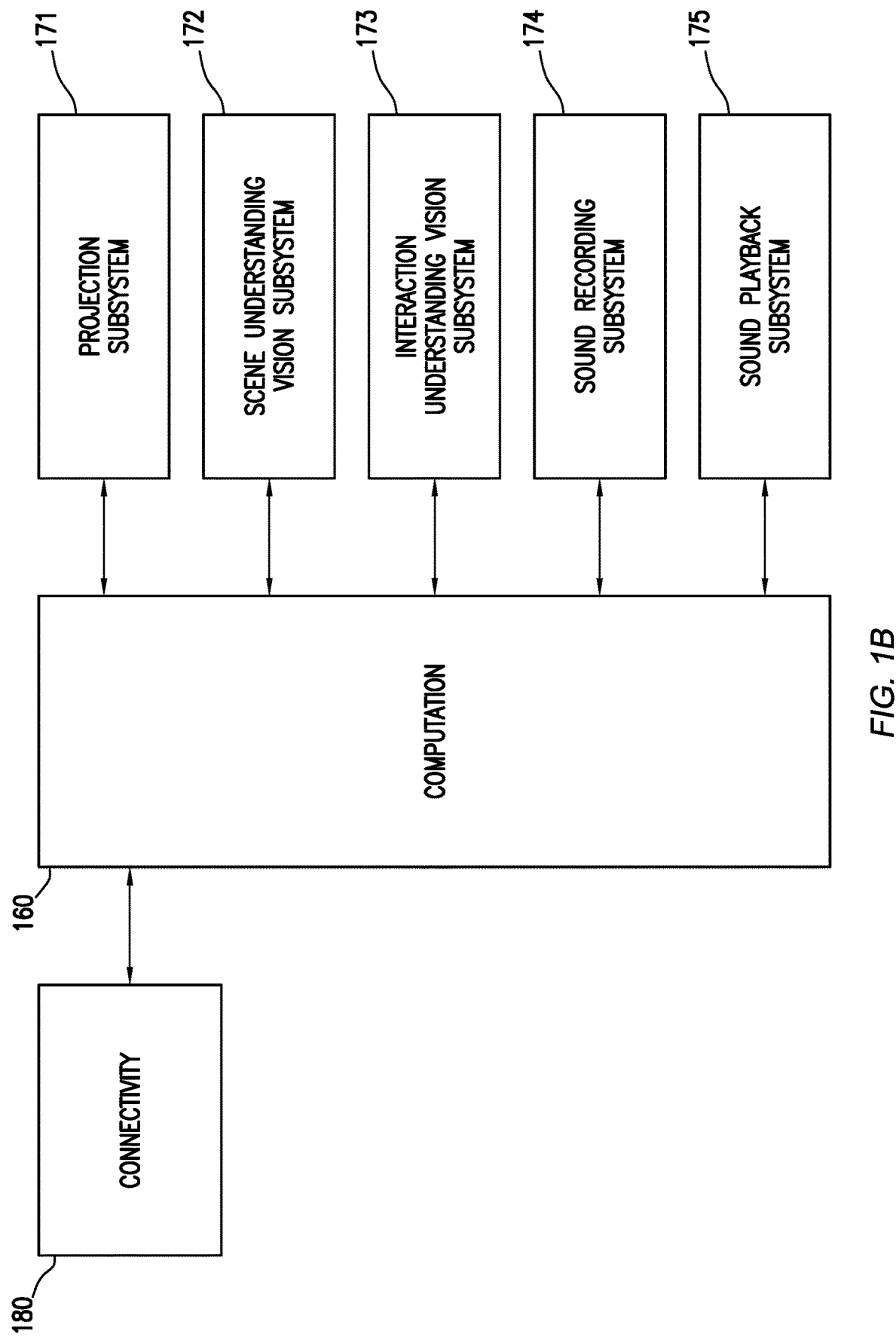
FIG. 1B illustrates an example system for providing augmented-reality experience.

FIG. 1B illustrates an example system for providing augmented-reality experience. In particular embodiments, the augmented-reality system illustrated in FIG. 1B may be implemented in the gateway computing system 120 or be distributed between the gateway computing system 120, one or more interaction devices 110, one or more external systems 130 or 140, or any combination thereof. The augmented-reality system may comprise a computation component 160 configured to execute a plurality of computational tasks. In particular embodiments, the computation component 160 may comprise a plurality of subsystems including a projection subsystem 171, a scene understanding vision subsystem 172, an interaction understanding vision subsystem 173, a sound recording subsystem 174, a sound playback subsystem 175. The projection subsystem 171 may be configured to execute computational tasks such as projecting images across various surfaces of the environment 150, maximizing brightness and pixel density, minimizing occlusion, automatically zooming or focusing, one or more other suitable computational tasks, or any combination thereof. The scene understanding vision subsystem 172 may be configured to, subject to the privacy settings of any relevant users, execute computational tasks such as tracking positions and general behavior of people inside of a room, one or more other suitable computation tasks, or any combination thereof. The interaction understanding vision subsystem 173 may be configured to, subject to privacy settings of any relevant users, execute computation tasks such as tracking fine movement and behavior of people and objects, one or more other suitable computational tasks, or any combination thereof. The sound recording subsystem 174 may be configured to, subject to privacy settings of any relevant users, execute computational tasks such as recording voice or ambient noise inside of the environment 150, performing directional sound recording (phase and amplitude), one or more other suitable computation tasks, or any combination thereof. The sound playback subsystem 175 may be configured to, subject to privacy settings of any relevant users, execute computational tasks such as performing playback of sound inside of a room, performing directional sound playback, one or more other suitable computational tasks, or any combination thereof. The example system may further comprise a connectivity component 180. The connectivity component 180 may be configured to connect the system to the internet and one or more external systems (e.g., the social-networking system 130) via one or more networks (e.g., Wi-Fi). Although FIG. 1B illustrates a particular system for providing augmented-reality experience comprising particular subsystems, this disclosure contemplates any suitable system for providing augmented-reality experience comprising any suitable subsystems.

Figure 2:
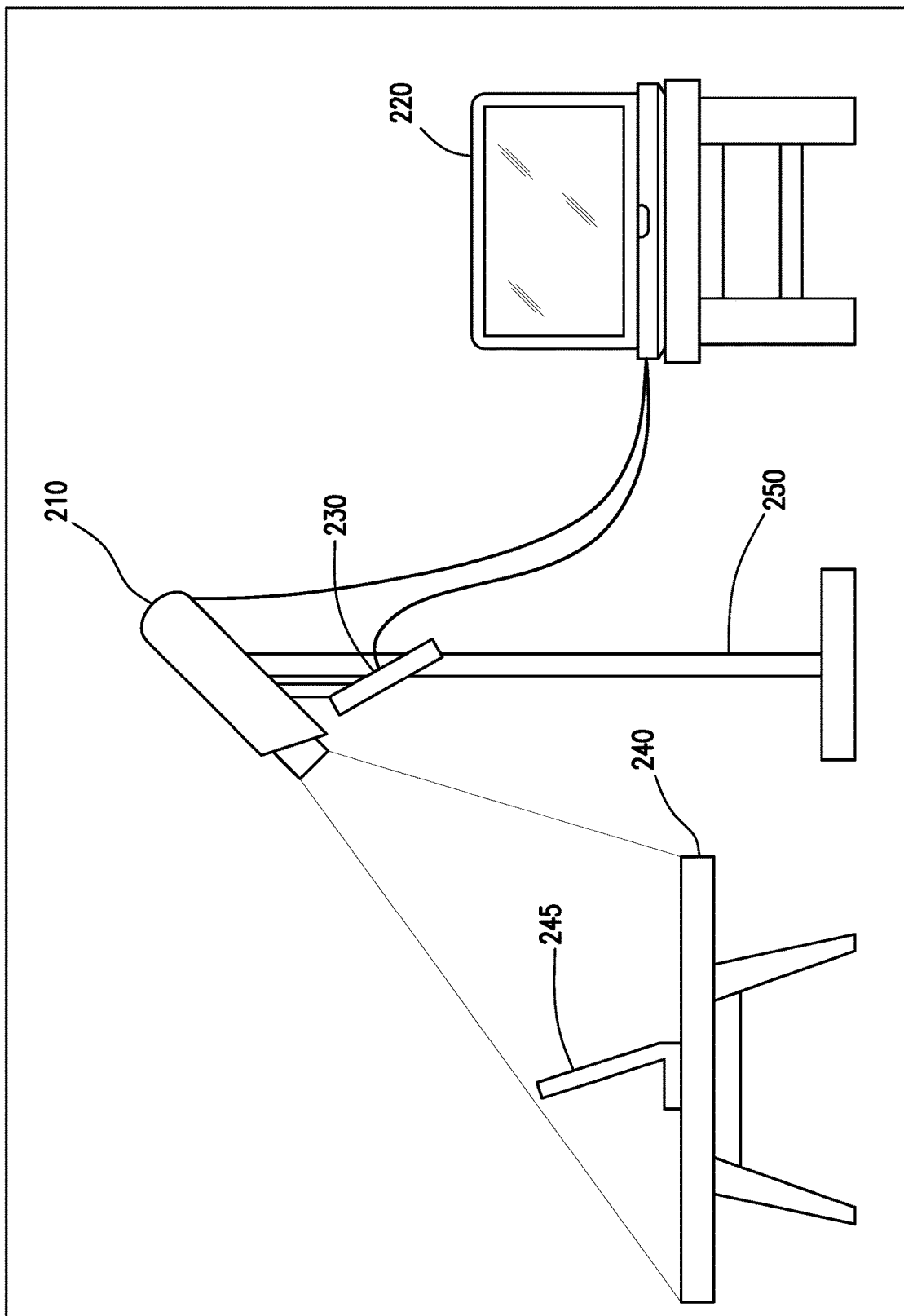
FIG. 2 illustrates an example setup of devices configured to provide augmented-reality experience.

FIG. 2 illustrates an example setup of devices configured to provide augmented-reality experience. The setup may comprise a projector 210, a computing device 220, a camera 230, a prop 245 sitting on a table surface 240, and a support structure 250. Although the computing device 220 is illustrated as a laptop computer in FIG. 2, it may be implemented as another computing device (e.g., a smart phone) in alternative embodiments. A smart phone may be mounted at the position of the camera 230 to take advantage of the camera integrated with the smart phone. In particular embodiments, the computing device 220 may control the projector 210 to project content on the table surface 240 or the prop 245. The computing device 220 may also receive data collected by the camera 230. The position and orientation of the projector 210 and the camera 230 may be controlled through the support structure 250. The computing device 220 may be connected to one or more remote systems through a network. Although FIG. 2 illustrates a particular setup of particular devices configured to provide augmented-reality experience, this disclosure contemplates any suitable setup of any suitable devices configured to provide augmented-reality experience.

In addition to the example setup illustrated by FIG. 2, an interaction device 110 may be associated with one or more of various other form factors. The form factors suitable for a particular interaction device 110 may at least in part depend on the placement of the interaction device 110. In particular embodiments, interaction devices 110 may be integrated with household objects (e.g., shelf, lamp, ceiling, tabletop). As examples and not by way of limitation, the AR devices may be mounted on the ceiling (pivotable and rotatable), be placed on tabletop or integrated with a table lamp (pointing at wall or table surface), be plugged-in a power light or integrated with a night light form factor (displaying holograms), be mounted on a wall or integrated with a shelf form factor (projecting onto wall above or below with integrated speaker), be integrated with a "wedge" form factor in a corner or edge of a room, or be placed on the floor with a stand (short throw). The interaction devices may also integrate various objects in indoor space that provide surfaces to project images on (e.g., curtain, blinds).

Figure 3:
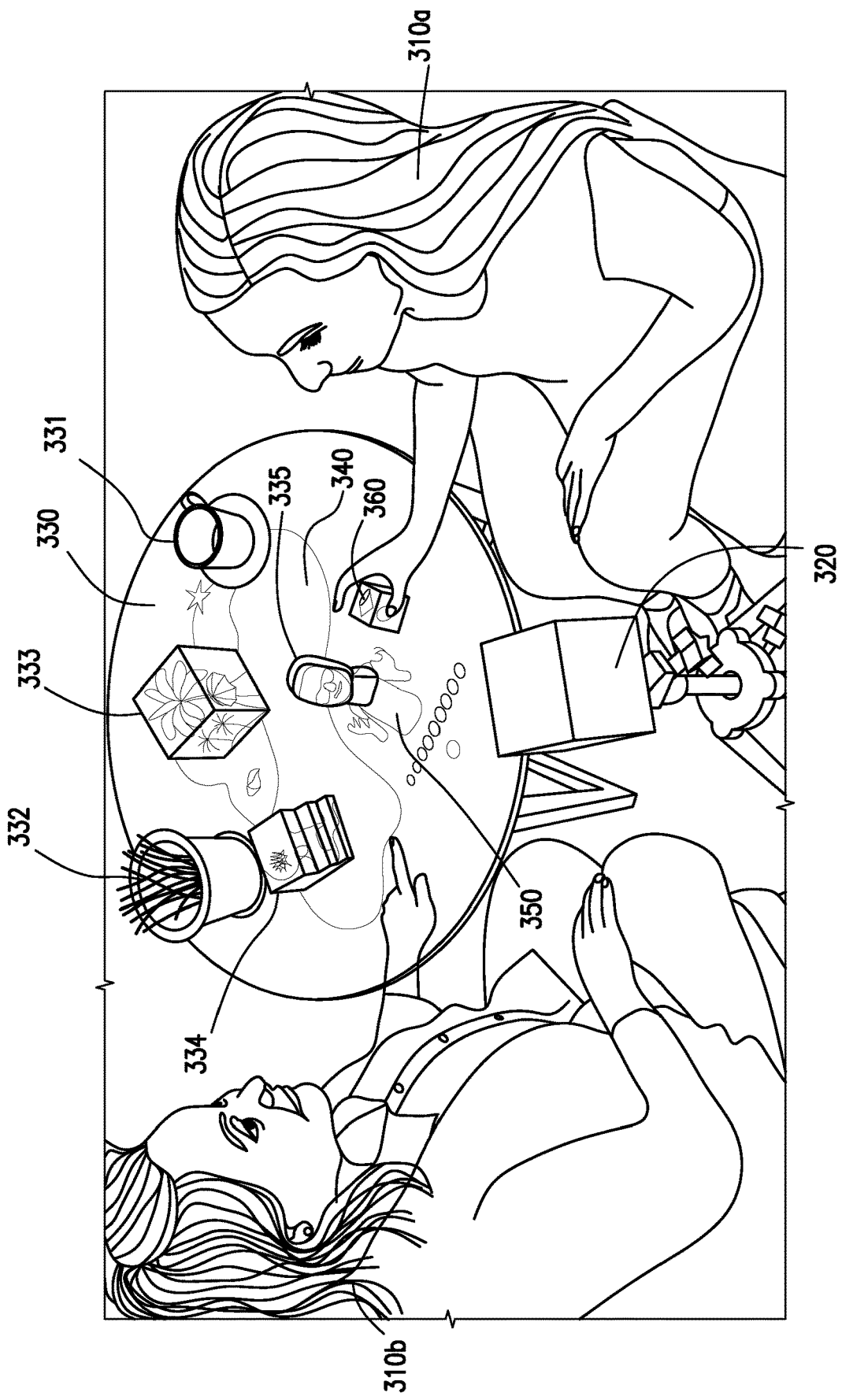
FIG. 3 illustrates an example application scenario for a system configured to provide augmented-reality experience.

FIG. 3 illustrates an example application scenario for a system configured to provide augmented-reality experience. As shown in FIG. 3, two users 310a and 310b may be sitting next to a table surface 330. An interaction device 320 may be placed in proximity to the table surface 330. There may be various objects 331-335 placed on the table surface 330. In particular embodiments, the interaction device 320 may project one or more media content objects on the table surface 330 and the objects 331-335. For example, the interaction device 320 may project a beach scene 340 onto the table surface 330 and the objects 333 and 334. The interaction device 320 may automatically adapt the projection to the three-dimensional shape of the objects 333 and 334. In particular, the interaction device 320 may selectively project trees and beach umbrellas on the cube 333 so that the trees and beach umbrellas appear to stand up. Similarly, the interaction device 320 may project a creek on to the stair-shaped object 334 to create an impression that water flows to a pool on the surface 330. As another example, the interaction device 320 may project an avatar 350 representing another user on the object 335 to enable real-time chatting with the user. The interaction device 320 may further project one or more buttons in front of the avatar 350 allowing the users 310a and 310b to interact and control the conversation with the user represented by the avatar 350. In particular, a camera associated with the interaction device 320 may capture a movement of the user 310a or 310b "touching" one of the projected buttons. The interaction device 320 may interpret the movement of the user 310a or 310b as a particular control input. As yet another example, the interaction device may project a virtual controller on the object 360 in a hand of the user 310a. The virtual controller may comprise one or more interactive elements. The user 310a may place a finger in proximity to one or more of the interactive elements to perform one or more control actions. Such actions may be captured by the camera associated with the interaction device 320. Although FIG. 3 illustrates a particular application scenario for a particular system configured to provide augmented-reality experience, this disclosure contemplates any suitable application scenarios for any suitable systems configured to provide augmented-reality experience.

Figure 4A:
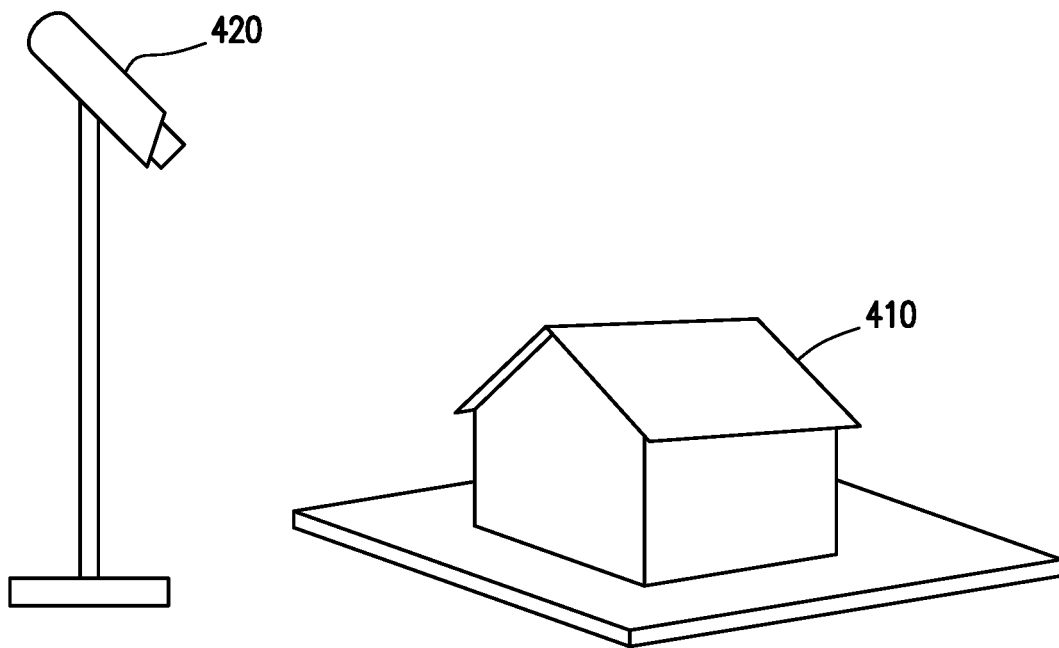
FIGS. 4A and 4B illustrate a device for projecting a media content item on a tangible object.
Figure 4B:
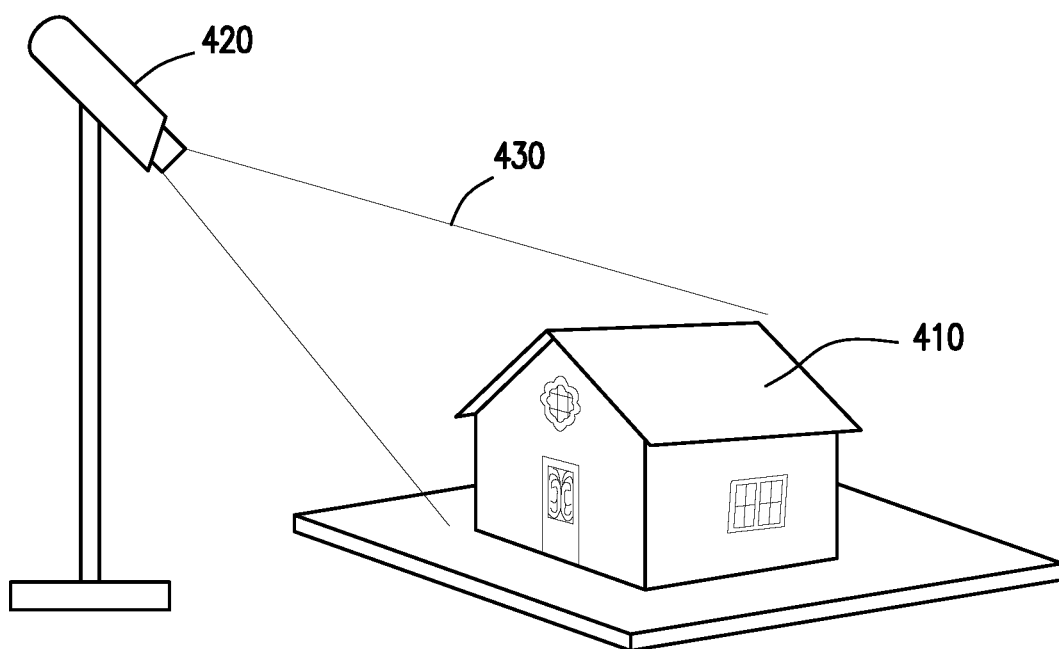

FIGS. 4A and 4B illustrates a device for projecting a media content item on a tangible object. In particular embodiments, each interaction device 110 may be configured to adapt or manipulate projection based on various factors, such as the direction of projection, the area projected on, projection distance. For example, the content or resolution of the projection may be adjusted based on the distance of projection. The interaction devices 110 may perform surface mapping to determine the shape, direction, texture, and color of a projectable surface. The interaction devices 110 may have different projection architectures adapted to projecting on different types of surfaces. As shown in FIG. 4A, an interaction device 420 may be placed in proximity to a tangible object 410. The tangible object 410 may be in the shape of a building. As shown in FIG. 4B, the interaction device 420 may target a light beam 430 on the tangible object 410. The interaction device 420 may have determined a shape of the object 410 and modify the image to be projected based on the shape of the object 410. In this manner, images corresponding to particular parts of a building (e.g., door, window) may be projected on appropriate positions on the tangible object 410. Although FIGS. 4A and 4B illustrates a particular device for projecting a particular media content item on a particular tangible object, this disclosure contemplates any suitable devices for projecting any suitable media content items on any suitable surfaces or objects.

Figure 5A:
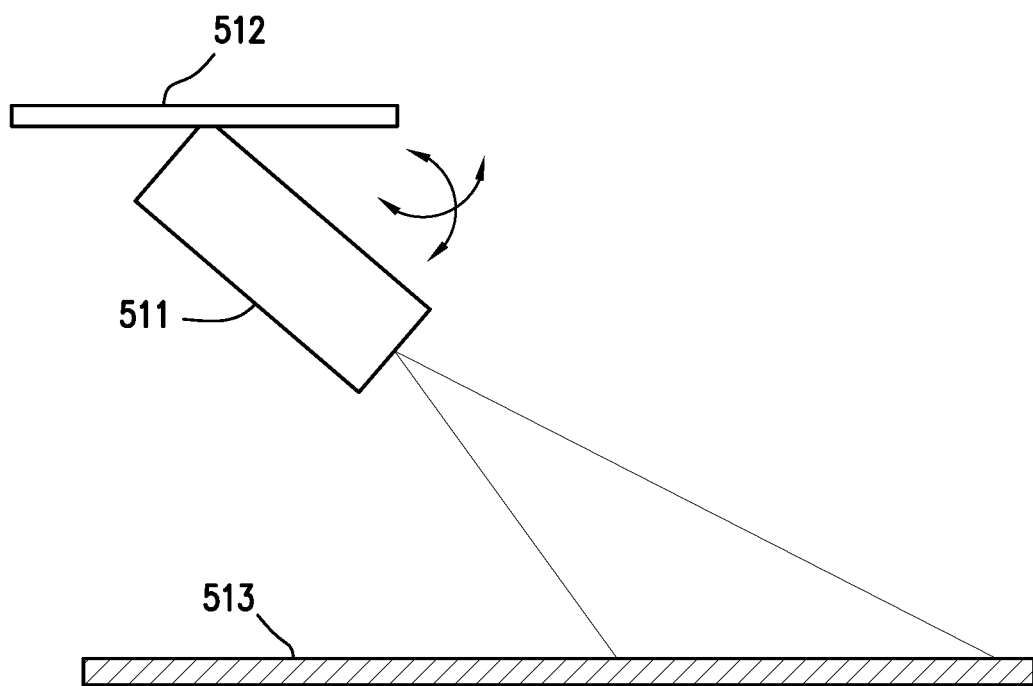
FIGS. 5A-5G each illustrates an example projection architecture.
Figure 5B:
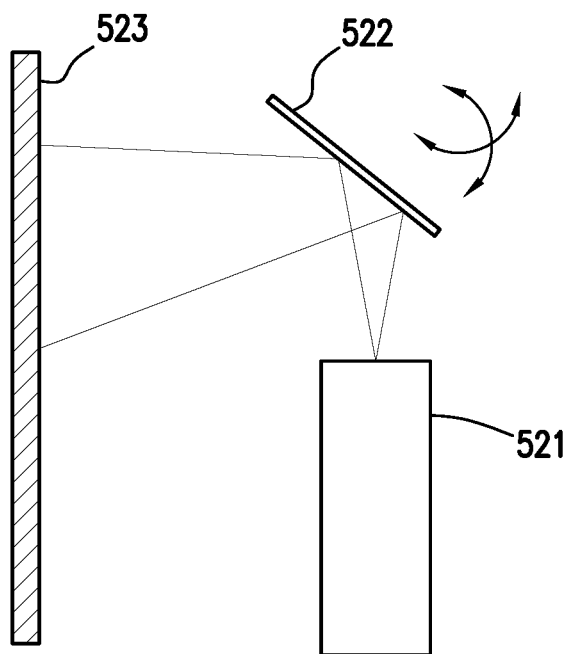
Figure 5C:
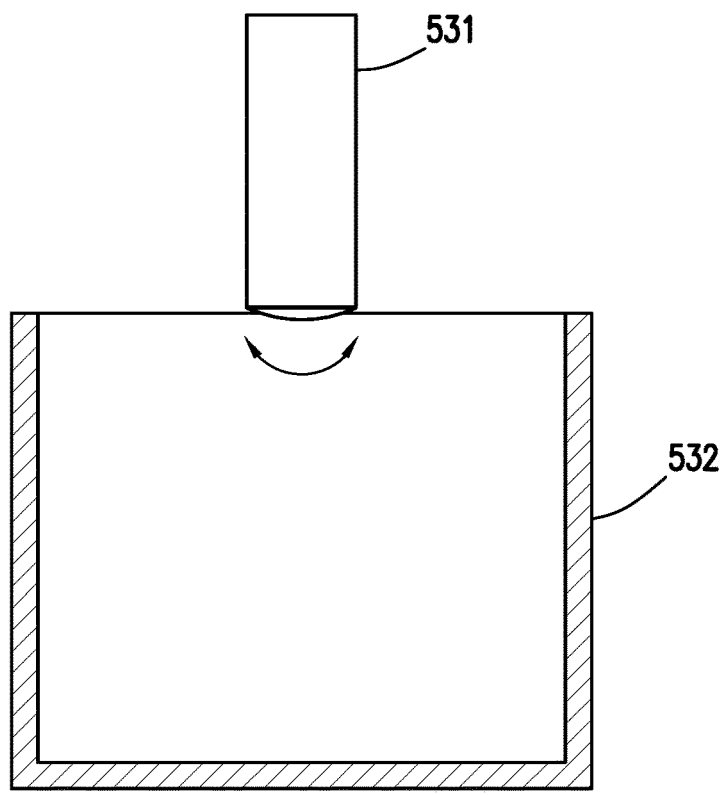
Figure 5D:
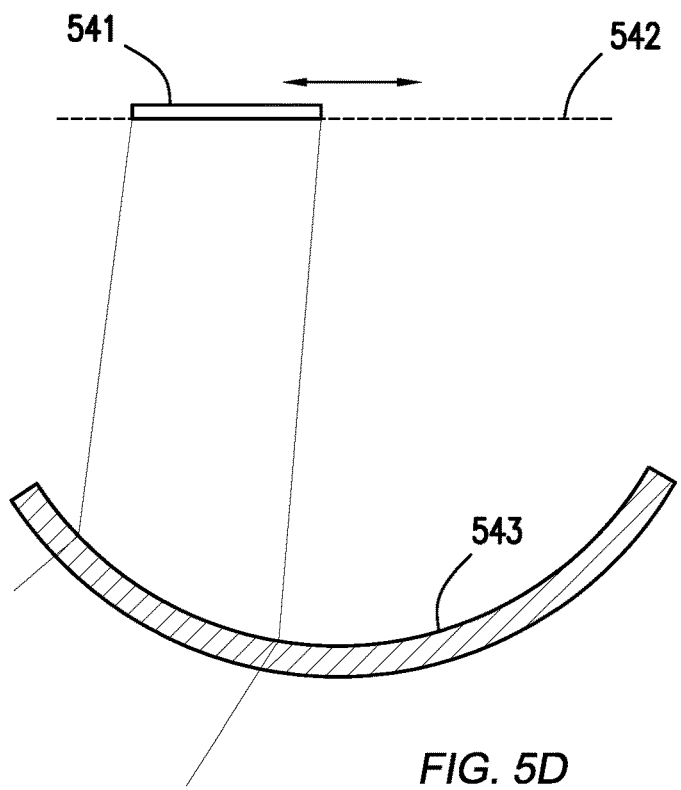
Figure 5E:
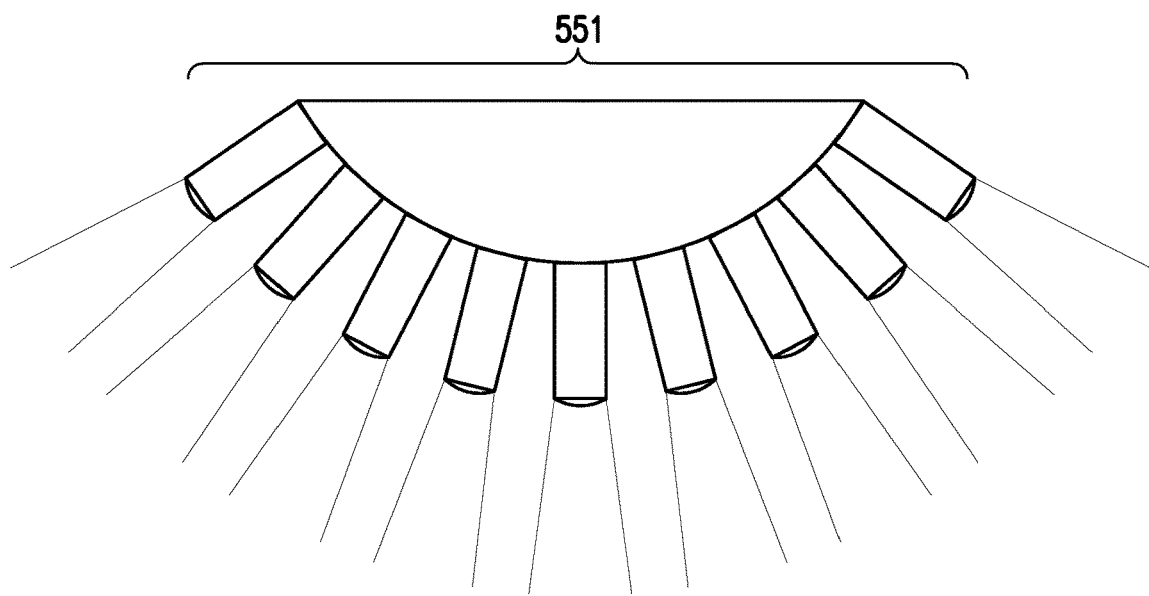
Figure 5F:
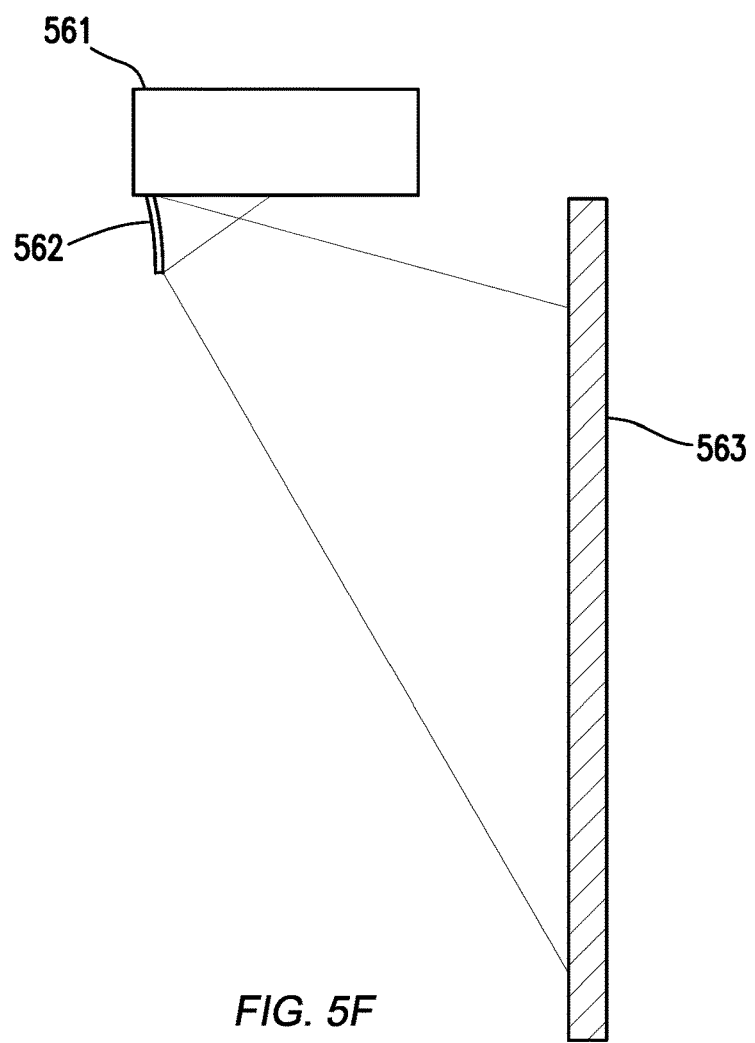
Figure 5G:
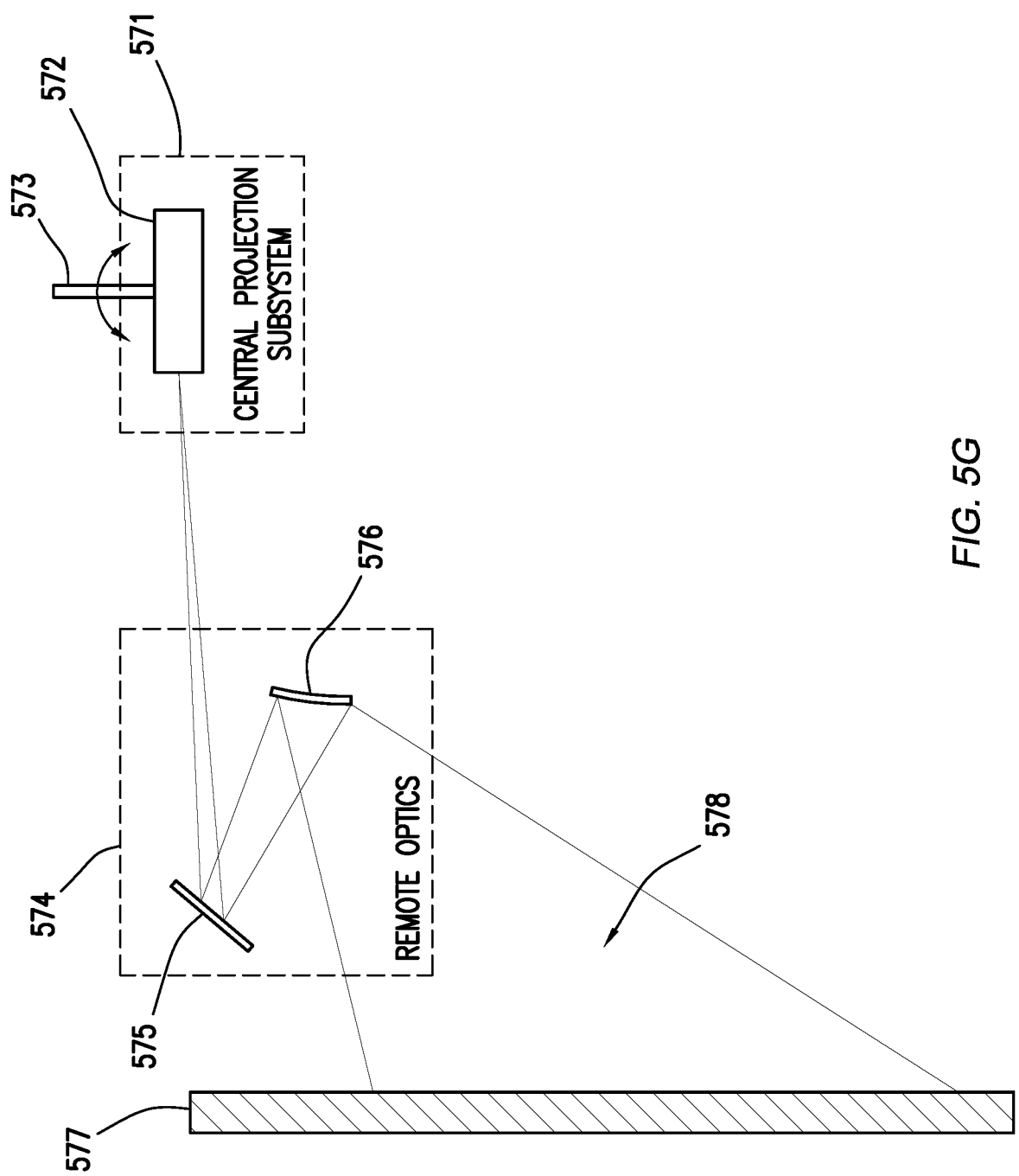

FIGS. 5A-5G each illustrates an example projection architecture. An interaction device 110 may be associated with one or more projection architectures appropriate based on the environment and the location of the interaction device 110. FIG. 5A illustrates direct-aim projection using a projector 511 onto a surface 513. The projector 511 may be attached to a stable structure 512 via a gimbal. FIG. 5B illustrates projection by a projector 521 through a steerable mirror 522 onto a surface 523. FIG. 5C illustrates wide-angle fisheye projection by a projector 531 onto surfaces 532. The projector 531 may comprise wide-angle lens to project, for example 180 degrees, in a whole room. The projector 531 may be placed in front of projector optics, which may be one or more light engines with waveguide. FIG. 5D illustrates windowed fisheye projection by a projector. The projector may be placed in front of a screen 542 that has a movable opening 541. The projector may be configured to project onto a hemispherical surface 543. The movable opening 541 may be used to select a part of the surface 543 to projected on. FIG. 5E illustrates "disco-ball" projection by an array of projectors 551 positioned on a spherical body. Each of the projectors 551 may be pointing to a slightly different direction from the others. FIG. 5F illustrates ultra-short-throw projection by a projector 561 onto a surface 563 through a convex mirror 562. This configuration may enable projection onto a surface 563 that is very close to the projector 561. FIG. 5G illustrates deconstructed projection using a central projection subsystem 571 and a set of remote optics 574 onto a surface 577. The central projection subsystem 571 may comprise a projector 572 steerable using a mechanical structure 573. The remote optics may comprise one or more optical devices 575 and 576. The direction of the light beam 578 may be controlled by the mechanical structure 573 and the optical devices 575 and 576. In particular embodiments, the projection architectures may further comprise, for example, laser-beam-steering (e.g., laser projection onto moveable MEMS mirrors/mirrors corresponding to different colors (RGB)), holographic-waveguide projection, other suitable projection architectures, or any combination thereof. Although FIGS. 5A-5G illustrate particular projection architectures, this disclosure contemplates any suitable projection architectures.

Figure 6A:
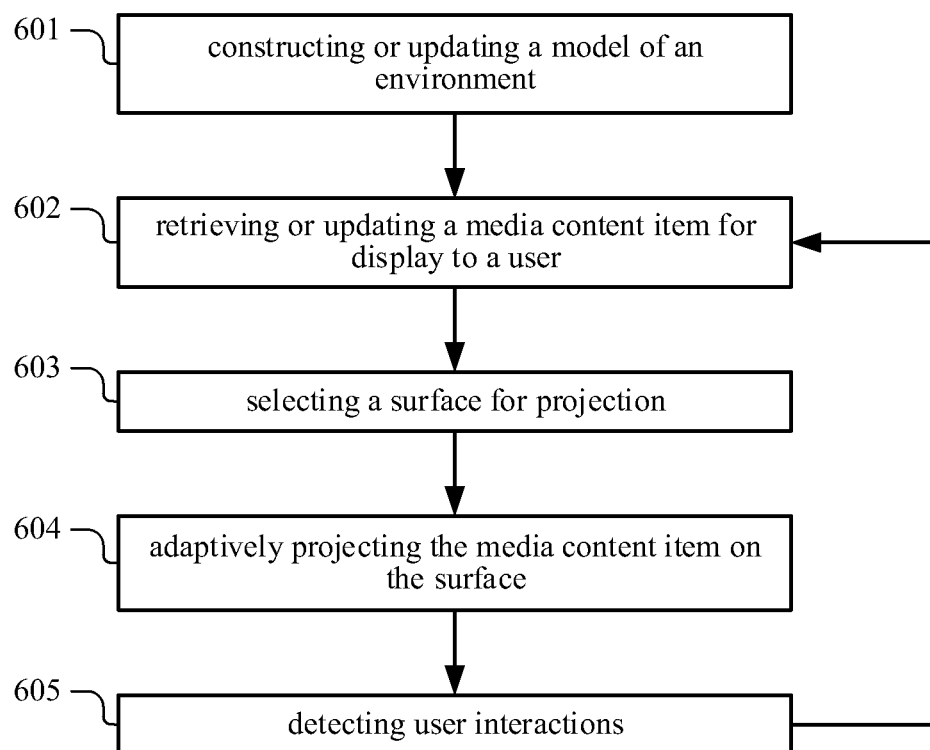
FIG. 6A illustrates an example method for providing an augmented-reality experience.

FIG. 6A illustrates an example method 600 for providing an augmented-reality experience. The method may begin at step 601, where an augmented-reality system may construct or update a model of an environment. At step 602, the augmented-reality system may retrieve or update a media content item for display to a user. At step 603, the augmented-reality system may select a surface for projection. At step 604, the augmented-reality system may adaptively project the media content item on the selected surface. At step 605, the augmented-reality system may detect one or more user interactions. Based on the user interactions, the augmented-reality system may repeat steps 602-604 of the method 600 by retrieving a new media content item or updating an existing media content item and projecting the media content item for the user. Particular embodiments may repeat one or more steps of the method of FIG. 6A, where appropriate. Although this disclosure describes and illustrates particular steps of the method of FIG. 6A as occurring in a particular order, this disclosure contemplates any suitable steps of the method of FIG. 6A occurring in any suitable order. Moreover, although this disclosure describes and illustrates an example method for providing an augmented-reality experience including the particular steps of the method of FIG. 6A, this disclosure contemplates any suitable method for providing an augmented-reality experience including any suitable steps, which may include all, some, or none of the steps of the method of FIG. 6A, where appropriate. Furthermore, although this disclosure describes and illustrates particular components, devices, or systems carrying out particular steps of the method of FIG. 6A, this disclosure contemplates any suitable combination of any suitable components, devices, or systems carrying out any suitable steps of the method of FIG. 6A.

Figure 6B:
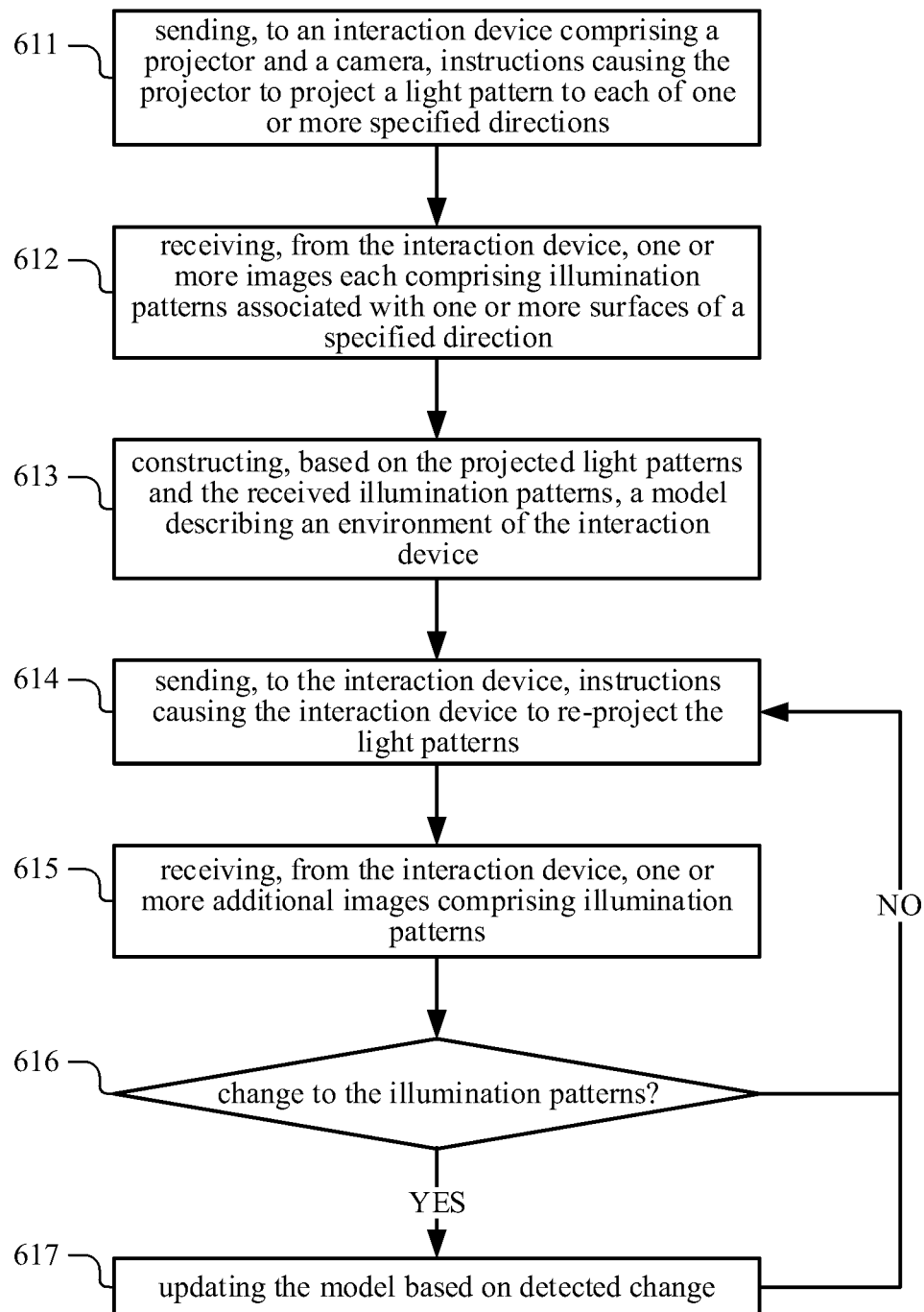
FIG. 6B illustrates an example method for constructing and updating a model of an indoor environment based on light projection and sensing.

FIG. 6B illustrates an example method 610 for constructing and updating a model of an indoor environment based on light projection and sensing. The method may begin at step 611, where a computing device (e.g., a gateway computing device 120, a controller module associated with an interaction device 110) may send, to an interaction device 110 comprising a projector and a camera, instructions causing the projector to project a light pattern to each of one or more specified directions. In particular embodiments, the light pattern comprises a point cloud.

At step 612, the computing device may receive, from the interaction device 110, one or more images each comprising illumination patterns associated with one or more surfaces of a specified direction. The illumination patterns may have been created by the light pattern interacting with the surfaces. Based on the illumination patterns, the computing device may detect one or more planes that are normal to the projector. It may reconstruct one or more objects based on the detected planes. It may further classify the objects or tag them with glyphs.

At step 613, the computing device may construct, based on the projected light patterns and the received illumination patterns, a model describing an environment of the interaction device 110. The model may comprise one or more characteristics of each of one or more objects in the environment and one or more characteristics of each of one or more surfaces in the environment. The characteristics for each object or surface may comprise a size, a shape, a color, a specularity, a texture, other suitable characteristics, or any combination thereof. In particular embodiments, the computing device may classify the objects in the environment and the characteristics of an object in the environment comprises a classification assigned to the object. An object may be classified on different dimensions including, for example, color (e.g., light, dark), size (large, small), shape (e.g., uniform, irregular), type (e.g., walls, furniture, appliances), another classification criterion, or any combination thereof. In particular embodiments, the model may further comprise a hierarchy of preferences associated with the objects and surfaces in the environment. The hierarchy of preferences may be created based on the characteristics of the objects and surfaces. In particular embodiments, the model may further comprise location information associated with one or more users in the environment and identification information associated with one or more of the users. The computing device may obtain the identification information by sending data associated with one or more users captured by sensor devices associated with interaction devices 110 to the social-networking system 130, which may return the requested identification information. The request for identification information may be sent to the social-networking system 130 only if the relevant users expressly allowed use of such identification information as part of the model of the environment. The social-networking system 130 may return the requested identification information only if the relevant users' privacy settings allow for use of such identification information by an augmented-reality system.

In particular embodiments, the computing device may update the model in real time or periodically to address changes or movements of the objects or surfaces in the environment 150. At step 614, the computing device may send, to the interaction device 110, instructions causing the interaction device 110 to re-project the light patterns. At step 615, the computing device may then receive, from the interaction device 110, one or more additional images comprising illumination patterns associated with one or more surfaces. At step 616, the computing device may determine whether there is any change to the illumination patterns associated with one or more surfaces. If change is detected, the computing device may update the model based on the detected change at step 617. Otherwise, the computing device may repeat the steps 614-616 after a pre-determined delay in attempt to keep the model up to date.

In particular embodiments, the model may be constructed based on data collected by a plurality of interaction devices 110. The computing device may send instructions causing the interaction devices 110 to project one or more additional light patterns and receive from each of the interaction devices 110 additional illumination patterns. The computing device may aggregate the data collected by the multiple interaction devices 110 in light of the positioning of the interaction devices 110 and update the model based on the additional light patterns and illumination patterns.

Particular embodiments may repeat one or more steps of the method of FIG. 6B, where appropriate. Although this disclosure describes and illustrates particular steps of the method of FIG. 6B as occurring in a particular order, this disclosure contemplates any suitable steps of the method of FIG. 6B occurring in any suitable order. Moreover, although this disclosure describes and illustrates an example method for constructing and updating a model of an indoor environment including the particular steps of the method of FIG. 6B, this disclosure contemplates any suitable method for constructing and updating a model of an indoor environment including any suitable steps, which may include all, some, or none of the steps of the method of FIG. 6B, where appropriate. Furthermore, although this disclosure describes and illustrates particular components, devices, or systems carrying out particular steps of the method of FIG. 6B, this disclosure contemplates any suitable combination of any suitable components, devices, or systems carrying out any suitable steps of the method of FIG. 6B.

Figure 6C:
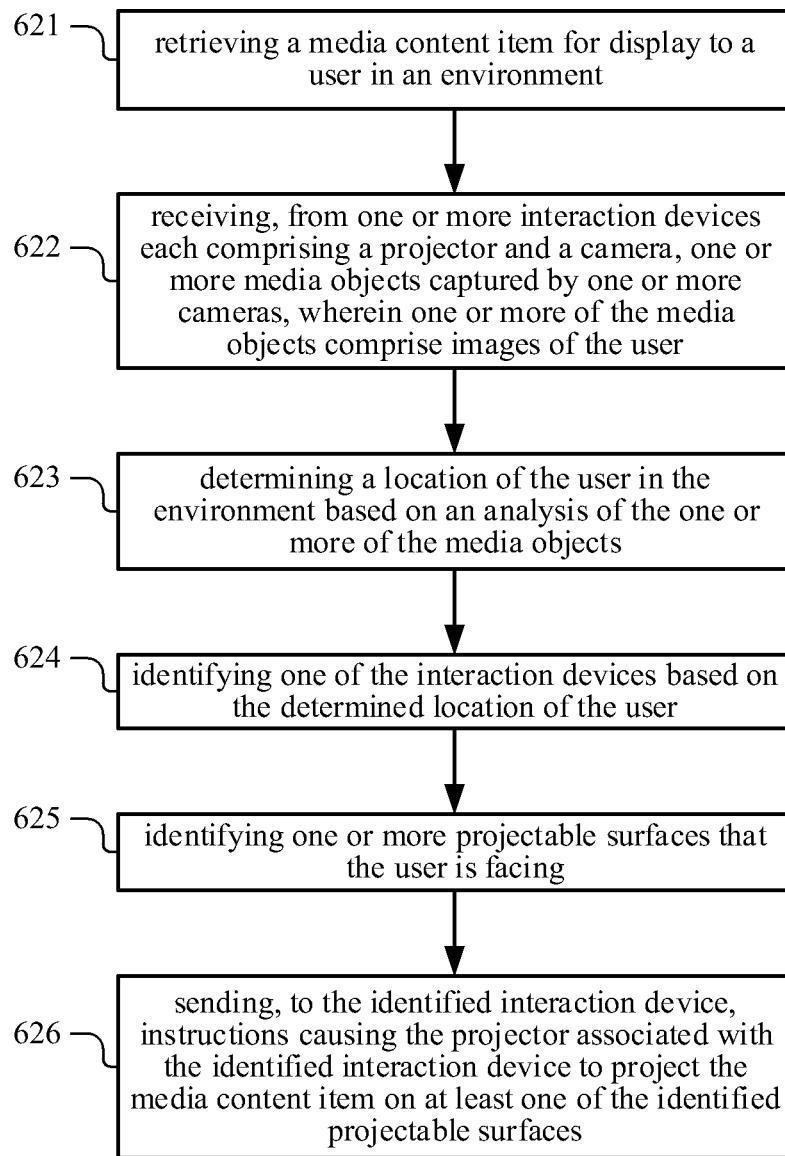
FIG. 6C illustrates an example method for identifying an interaction device and a surface for projection of a media content item.

FIG. 6C illustrates an example method 620 for identifying an interaction device 110 and a surface for projection of a media content item. In particular embodiments, the augmented-reality system may select a surface for projecting a particular media content item. The selection process may be trigged based on user activities, user tracking (e.g., where users are, what they are facing), scene understanding based on stereo information, or projection locking to a surface, a user, or an object (e.g., world locked). The method 620 may begin at step 621, where a computing device (e.g., a gateway computing device 120, a controller module associated with an interaction device 110) may retrieve a media content item for display to a user in an environment. The media content item may have been received from an external system such as a social-networking system 130 or a third-party system 140. In the alternative, the media content item may be retrieved from a local storage of the computing device.

At step 622, the computing device may receive, from one or more interaction devices 110 each comprising a projector and a camera, one or more media objects captured by one or more cameras. One or more of the media objects may comprise images of the user. At step 623, the computing device may determine a location of the user in the environment based on an analysis of the one or more of the media objects. At step 624, the computing device may identify one of the interaction devices 110 based on the determined location of the user. The identified interaction device 110 may be in proximity to the user or may be configured to project to a surface visible to the user given the user's location. The identified interaction device 110 may also be picked from the interaction devices 110 that have captured a media object that comprises an image of the user.

In particular embodiments, the computing device may be identified further based on scene understanding. In particular embodiments, one or more of the interaction devices 110 may each comprise an audio sensor and be configured to collect audio signals from the environment. The computing device may further receive, from each of the one or more interaction devices 110, audio signals collected by the audio sensor associated with the interaction device 110. The computing device may extract one or more features associated with a scene-understanding model based on an analysis of the received audio signals and media objects. It may then assign a scene category (e.g., party, meeting) to the environment based at least in part on the one or more features and identify the interaction device 110 further based on the scene category. In particular embodiments, the computing device may be identified further based on a gesture of the user. The computing device may identify a gesture of the user (e.g., finger pointing at a wall) based on the one or more media objects and identify the interaction device 110 further based on the gesture of the user.

At step 625, the computing device may identify one or more projectable surfaces that the user is facing. Alternatively, the computing device may identify one or more projectable surfaces that the user is not facing but are conveniently visible to the user. The projectable surfaces may be identified based on factors such as the determined location of the user, one or more characteristics associated with the media content item, one or more characteristics associated with the surfaces in the environment, detection of the face or eyes of the user subject to privacy settings of the user, other suitable factors, or any combination thereof.

At step 626, the computing device may send to the identified interaction device 110, the media content item to be displayed and instructions causing the projector associated with the identified interaction device 110 to project the media content item on at least one of the identified projectable surfaces.

In particular embodiments, the identified projectable surface may be associated with a tangible object in the environment that is movable. The computing device may send instructions to one or more interaction devices 110 causing projection of the media content item to follow the tangible object. In particular embodiments, the computing device may send, to the identified interaction device 110, instructions causing the projector associated with the identified interaction device 110 to project the media content item on a tangible object at a first location. The computing device may receive, from the cameras associated with one or more interaction devices 110, one or more additional media objects captured by the cameras. The one or more additional media objects may comprise images of the tangible object. The computing device may determine, based on the additional media objects, that the tangible object has moved from the first location to a second location. The computing device may then send, to a different interaction device 110, instructions causing the projector associated with the different interaction device 110 to project the media content item on the tangible object at the second location.

In particular embodiments, the computing device may send instructions to one or more interaction devices 110 causing projection of the media content item to follow the user. In particular embodiments, the computing device may receive, from the cameras associated with one or more of the interaction devices 110, one or more additional media objects captured by the cameras. The one or more additional media objects may comprise images of the user. The computing device may determine, based on the additional media objects, that the user has moved to a new location. The computing device may then send, to a different interaction device 110 in proximity to the new location, instructions causing the projector associated with the different interaction device 110 to project the media content item.

Particular embodiments may repeat one or more steps of the method of FIG. 6C, where appropriate. Although this disclosure describes and illustrates particular steps of the method of FIG. 6C as occurring in a particular order, this disclosure contemplates any suitable steps of the method of FIG. 6C occurring in any suitable order. Moreover, although this disclosure describes and illustrates an example method for identifying an interaction device 110 and a surface for projection of a media content item including the particular steps of the method of FIG. 6C, this disclosure contemplates any suitable method for identifying an interaction device 110 and a surface for projection of a media content item including any suitable steps, which may include all, some, or none of the steps of the method of FIG. 6C, where appropriate. Furthermore, although this disclosure describes and illustrates particular components, devices, or systems carrying out particular steps of the method of FIG. 6C, this disclosure contemplates any suitable combination of any suitable components, devices, or systems carrying out any suitable steps of the method of FIG. 6C.

Figure 6D:
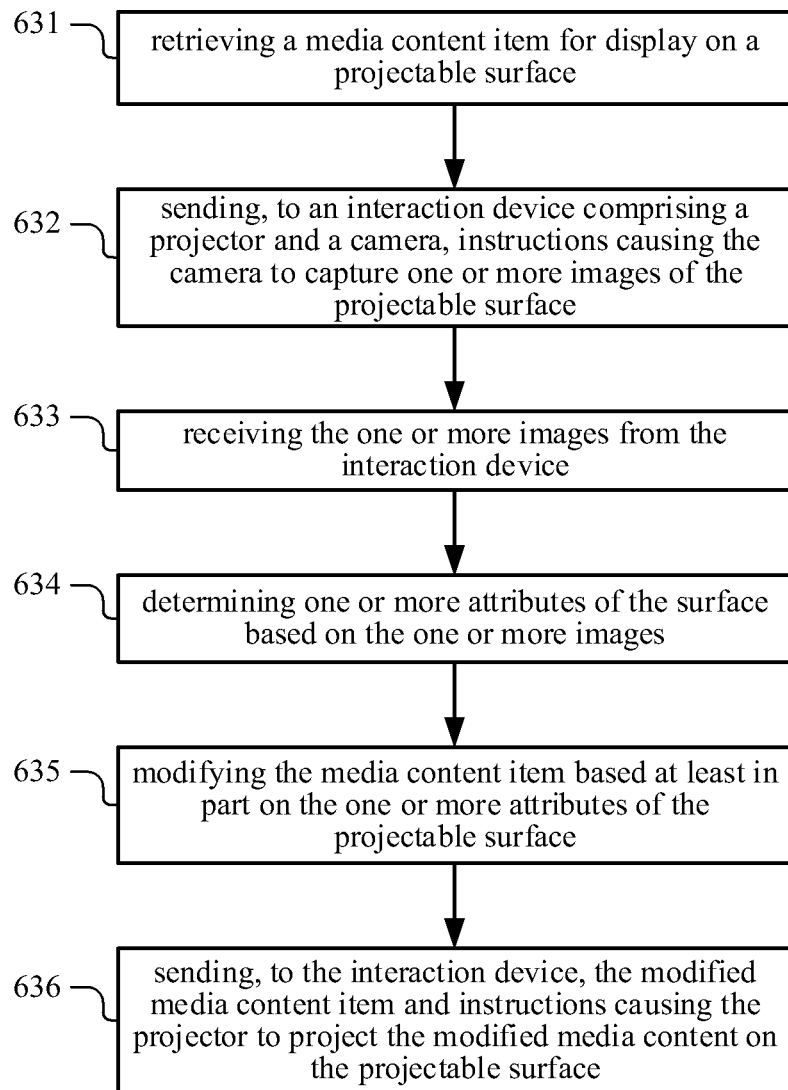
FIG. 6D illustrates an example method for adapting a media content item for projection on a surface.

FIG. 6D illustrates an example method 630 for adapting a media content item for projection on a surface. In particular embodiments, the augmented-reality system may project a media content item on the selected surface. The augmented-reality system may adapt the projected content to the context and the environment. The method may begin at step 631, where a computing device (e.g., a gateway computing device 120, a controller module associated with an interaction device 110) may retrieve a media content item for display on a projectable surface. At step 632, the computing device may send, to an interaction device 110 comprising a projector and a camera, instructions causing the camera to capture one or more images of the projectable surface. Then, at step 633, the computing device may receive the one or more images from the interaction device 110.

At step 634, the computing device may determine one or more attributes of the surface based on the one or more images. The attributes of the surface may comprise, for example, a three-dimensional shape of the surface, a color of the surface, transparency of the surface, specularity of the surface, a structure of the surface with respect to one or more other surfaces, a three-dimensional movement of the surface, one or more other suitable attributes, or any combination thereof.

At step 635, the computing device may modify the media content item based at least in part on the one or more attributes of the projectable surface. In particular embodiments, the media content item may be modified to map to the three-dimensional shape of the surface. In particular embodiments, the augmented-reality system may perform projection mapping to the selected service based on dynamic tracking of the surface. The augmented-reality system may track attributes of the surface including, for example, three-dimensional shape of the surface, color of the surface (e.g., light/dark), transparency of the surface, specularity of the surface, structure of multiple surfaces, or three-dimensional movement of an object associated with the surface.

In particular embodiments, the augmented-reality system may perform projection so as to avoid non-mapped objects. The computing device may identify a tangible object positioned between a selected interaction device 110 and a selected projectable surface. The computing device may modify the media content item based at least in part on the position of the tangible object. As an example and not by way of limitation, the computing system may remove a portion of the media content item, distorting a shape of the media content item, zooming or focusing a projector to change a size of the projected media content item, or make another suitable change to the media content item.

In particular embodiments, the augmented-reality system may perform "graceful degradation" of a media content item, which may include downgrading the media content item to simple, high-contrast content for projection on a less-than-optimal surface. In particular embodiments, the computing device may decrease a resolution of the media content item and increasing a color contrast of the media content item based on one or more attributes of the surface.

At step 636, the computing device may send, to the interaction device 110, the modified media content item and instructions causing the projector to project the modified media content on the projectable surface. The instructions may cause the projector to project the modified media content in a manner that is adapted to the attributes of the surface. As an example and not by way of limitation, the instructions may comprise specification of an angle or skew of the projector. The angle or skew may be determined based on, for example, a slope of the surface.

In particular embodiments, the computing device may update a projected media content item based on a change to one or more attributes of a surface. The computing device may receive one or more additional images from the interaction device 110, detect a change of one or more attributes of the surface based on the additional images, and adjust the media content item based on the detected change.

Particular embodiments may repeat one or more steps of the method of FIG. 6D, where appropriate. Although this disclosure describes and illustrates particular steps of the method of FIG. 6D as occurring in a particular order, this disclosure contemplates any suitable steps of the method of FIG. 6D occurring in any suitable order. Moreover, although this disclosure describes and illustrates an example method for adapting a media content item for projection on a surface including the particular steps of the method of FIG. 6D, this disclosure contemplates any suitable method for adapting a media content item for projection on a surface including any suitable steps, which may include all, some, or none of the steps of the method of FIG. 6D, where appropriate. Furthermore, although this disclosure describes and illustrates particular components, devices, or systems carrying out particular steps of the method of FIG. 6D, this disclosure contemplates any suitable combination of any suitable components, devices, or systems carrying out any suitable steps of the method of FIG. 6D.

Figure 6E:
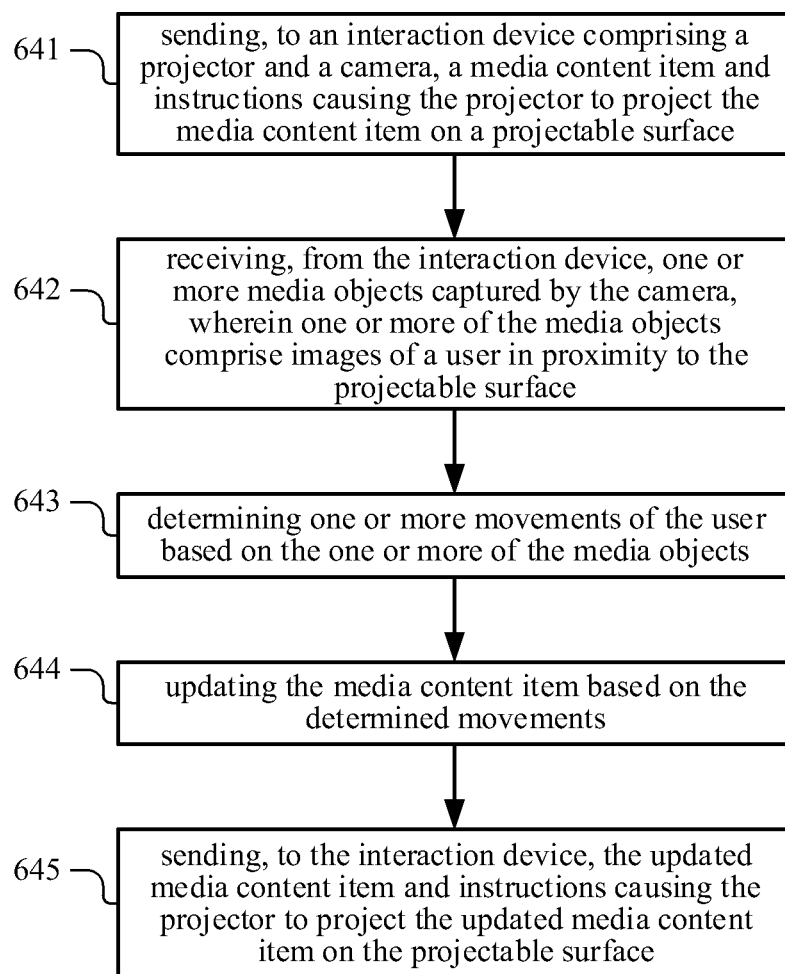
FIG. 6E illustrates an example method for updating a projected media content item based on user actions.

FIG. 6E illustrates an example method 640 for updating a projected media content item based on user actions. In particular embodiments, the augmented-reality system may detect various user interactions. Such user interactions may comprise two-dimensional or three-dimensional interactions with projections on a surface, a gesture of the user, interactions with a virtual controller projected on the user's body, interactions with a virtual controller projected on a tangible object, other suitable user interactions, or any combination thereof. In particular embodiments, the augmented-reality system may also detect audio signals, including vocal instructions by the user. The system may interpret such user instructions using speech recognition. The augmented-reality system may also interpret user interactions leveraging understanding of user identity and personal preferences. The augmented-reality system may only use information about user identity or personal preferences if such use is expressly allowed by privacy settings of the relevant users.

The method 640 may begin at step 641, where a computing device (e.g., a gateway computing device 120, a controller module associated with an interaction device 110) may send, to an interaction device 110 comprising a projector and a camera, a media content item and instructions causing the projector to project the media content item on a projectable surface. At step 642, the computing device may receive, from the interaction device 110, one or more media objects captured by the camera. One or more of the media objects comprise images of a user in proximity to the projectable surface. At step 643, the computing device may determine one or more movements of the user based on the one or more of the media objects.

In particular embodiments, the computing device may extract a gesture of the user based on the movements of the user. In particular embodiments, the movements of the user may comprise movements of particular body parts of the user such as hands, arms, legs, head, fingers, or other recognized body movements. The body movements may comprise a two-dimensional movement of a body part of the user in a plain parallel to the projectable surface or a three-dimensional movement of the body part of the user. The computing device may extract one or more features from the detected body movements, compare the extracted features to a model of gestures, and determine the meaning of the gesture based on the comparison.

In particular embodiments, the computing device may extract vocal instructions of the user. The computing device may receive audio signals collected by one or more interaction devices 110. The audio signals may comprise speech by the user, which may be identified based on voice recognition subject to the privacy settings of any relevant user. The computing device may use speech recognition to identify one or more pieces of vocal instructions by the user from the audio signals.

At step 644 of the method 640, the computing device may update the media content item based on the determined movements. In particular embodiments, the computing device may update one or more elements of the media content item that have been interacted with by the user. In the alternative, the computing device may retrieve a different media content item based on the detected user interactions. The computing device may also update the media content item based on vocal instructions by the user.

At step 645, the computing device may send, to the interaction device 110, the updated media content item and instructions causing the projector to project the updated media content item on the projectable surface.

In particular embodiments, at least part of the user actions may be processed at a remote server subject to the privacy settings of any relevant user. In particular embodiments, the computing device may send, to a server computing device (e.g., the social-networking system 130, third-party system 140), information associated with the one or more movements of the user only if the relevant users expressly allow such information to be sent to the specific server computing device. The server computing device may process the received movements information and identify one or more user gestures or instructions. The server computing device may then identify an appropriate media content item for display to the user and send it to the computing device only if the relevant users expressly allow the movements information to be used by the server computing device for identifying content to display to the user. The computing device may receive, from the server computing device, the new media content item selected based on the movements of the user. The computing device may then send, to another interaction device 110, the new media content item and instructions causing the other interaction device 110 to project the new media content item on another projectable surface.

In particular embodiments, subject to privacy settings of any relevant user, the computing device may determine an identity of the user based at least in part on the one or more of the media objects comprising images of the user. The determination of the identity may be carried out based on one or more visual or vocal features of the user. Subject to privacy settings of any relevant user, the task of user identification may be relayed to a social-networking system 130. In particular embodiments, the computing device may send, to a server computing device associated with a social-networking system, one or more of the media objects and a request for user identification. The computing device may send the media objects or the request for user identification only if the relevant users expressly allow such information to be sent to the social-networking system 130. The social-networking system 130 may perform identification of the user by comparing visual features of the media objects with features associated with content objects associated with profiles of newsfeed of various users. Upon successful identification of a user, the social-networking system 130 may return information associated with the user to the computing device. The social-networking system 130 may perform user identification or return information associated with users only if the relevant users expressly allow such activities by the social-networking system 130. The computing device may thereby receive, from the server computing device associated with the social-networking system, such social-networking information associated with the user. The augmented-reality system may identify content for display to a user based on the determined identity of the user subject to privacy settings of any relevant users.

In particular embodiments, a gesture of the user may be determined based on the user's interaction with virtual controller elements projected on a tangible object. In particular embodiments, the computing device may send, to another interaction device 110, instructions causing the other interaction device 110 to project, on a tangible object, a media content item representing a controller. The one or more movements of the user may be determined with respect to the controller projected on the tangible object.

In particular embodiments, a gesture of the user may be determined based on the user's interactions with virtual controller elements projected on the body of the user. In particular embodiments, the computing device may send, to another interaction device 110, instructions causing the other interaction device 110 to project, on a first body part of the user, a media content item representing a controller. The one or more movements of the user may comprise a movement of a second body part of the user with respect to the controller projected on the first body part.

Particular embodiments may repeat one or more steps of the method of FIG. 6E, where appropriate. Although this disclosure describes and illustrates particular steps of the method of FIG. 6E as occurring in a particular order, this disclosure contemplates any suitable steps of the method of FIG. 6E occurring in any suitable order. Moreover, although this disclosure describes and illustrates an example method for updating a projected media content item based on user actions including the particular steps of the method of FIG. 6E, this disclosure contemplates any suitable method for updating a projected media content item based on user actions including any suitable steps, which may include all, some, or none of the steps of the method of FIG. 6E, where appropriate. Furthermore, although this disclosure describes and illustrates particular components, devices, or systems carrying out particular steps of the method of FIG. 6E, this disclosure contemplates any suitable combination of any suitable components, devices, or systems carrying out any suitable steps of the method of FIG. 6E.

In particular embodiments, the software of the augmented-reality system may provide various user experience features through the interaction devices 110. As an example and not by way of limitation, the augmented-reality system may provide a "spot of light" feature, which may include, projecting a figure using light with personality (i.e., virtual assistant) instead of a projected image, changing colors, shapes, images, animation, simulating emotions (e.g., yellow light to represent happiness), and simulate human visual cues (e.g., gaze) to indicate information. As another example and not by way of limitation, the augmented-reality system may provide an "ambient display" feature, which may include displaying passive information (e.g., projection of clock, background projection of colors to indicate weather). The display may be subtle, in the background, or at-the-ready (e.g., sound activated). As another example and not by way of limitation, the augmented-reality system may display a virtual boundary to block out areas not to be captured/projected onto (could be adjusted w/ gestures). As another example and not by way of limitation, the augmented-reality system may also provide for display a marketplace in which the user may make a one-time purchase of or subscribe to augmented-reality products or applications.

Figure 7:
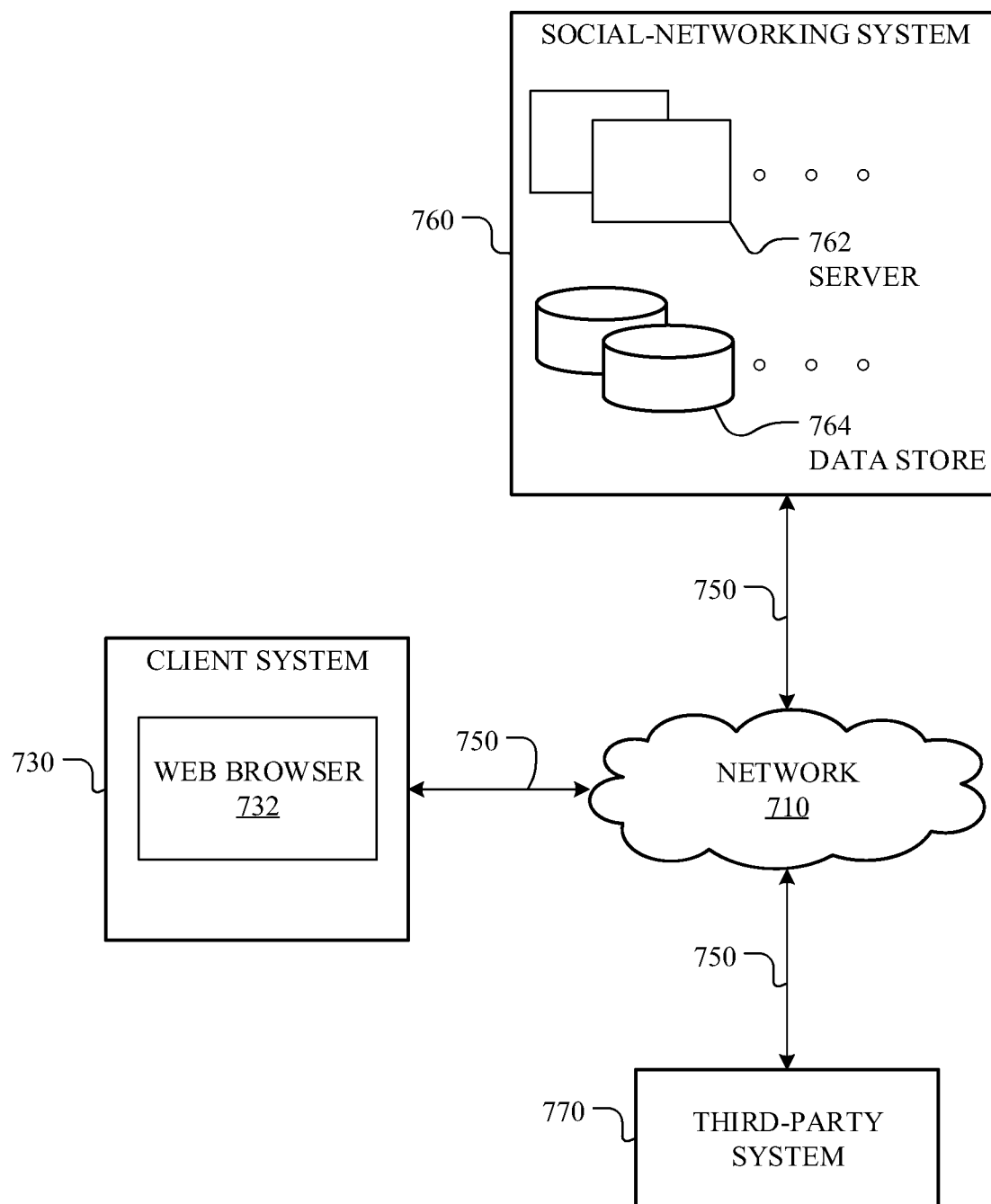
FIG. 7 illustrates an example network environment associated with a social-networking system.

FIG. 7 illustrates an example network environment 700 associated with a social-networking system. Network environment 700 includes a client system 730, a social-networking system 760, and a third-party system 770 connected to each other by a network 710. Although FIG. 7 illustrates a particular arrangement of client system 730, social-networking system 760, third-party system 770, and network 710, this disclosure contemplates any suitable arrangement of client system 730, social-networking system 760, third-party system 770, and network 710. As an example and not by way of limitation, two or more of client system 730, social-networking system 760, and third-party system 770 may be connected to each other directly, bypassing network 710. As another example, two or more of client system 730, social-networking system 760, and third-party system 770 may be physically or logically co-located with each other in whole or in part. Moreover, although FIG. 7 illustrates a particular number of client systems 730, social-networking systems 760, third-party systems 770, and networks 710, this disclosure contemplates any suitable number of client systems 730, social-networking systems 760, third-party systems 770, and networks 710. As an example and not by way of limitation, network environment 700 may include multiple client system 730, social-networking systems 760, third-party systems 770, and networks 710.

This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 may connect client system 730, social-networking system 760, and third-party system 770 to communication network 710 or to each other. This disclosure contemplates any suitable links 750. In particular embodiments, one or more links 750 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 750 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 750, or a combination of two or more such links 750. Links 750 need not necessarily be the same throughout network environment 700. One or more first links 750 may differ in one or more respects from one or more second links 750.

In particular embodiments, client system 730 may be an electronic device including hardware, software, or embedded logic components or a combination of two or more such components and capable of carrying out the appropriate functionalities implemented or supported by client system 730. As an example and not by way of limitation, a client system 730 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 730. A client system 730 may enable a network user at client system 730 to access network 710. A client system 730 may enable its user to communicate with other users at other client systems 730.

In particular embodiments, client system 730 may include a web browser 732, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 730 may enter a Uniform Resource Locator (URL) or other address directing the web browser 732 to a particular server (such as server 762, or a server associated with a third-party system 770), and the web browser 732 may generate a Hyper Text Transfer Protocol (HTTP) request and communicate the HTTP request to server. The server may accept the HTTP request and communicate to client system 730 one or more Hyper Text Markup Language (HTML) files responsive to the HTTP request. Client system 730 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 760 may be a network-addressable computing system that can host an online social network. Social-networking system 760 may generate, store, receive, and send social-networking data, such as, for example, user-profile data, concept-profile data, social-graph information, or other suitable data related to the online social network. Social-networking system 760 may be accessed by the other components of network environment 700 either directly or via network 710. As an example and not by way of limitation, client system 730 may access social-networking system 760 using a web browser 732, or a native application associated with social-networking system 760 (e.g., a mobile social-networking application, a messaging application, another suitable application, or any combination thereof) either directly or via network 710. In particular embodiments, social-networking system 760 may include one or more servers 762. Each server 762 may be a unitary server or a distributed server spanning multiple computers or multiple datacenters. Servers 762 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 762 may include hardware, software, or embedded logic components or a combination of two or more such components for carrying out the appropriate functionalities implemented or supported by server 762. In particular embodiments, social-networking system 760 may include one or more data stores 764. Data stores 764 may be used to store various types of information. In particular embodiments, the information stored in data stores 764 may be organized according to specific data structures. In particular embodiments, each data store 764 may be a relational, columnar, correlation, or other suitable database. Although this disclosure describes or illustrates particular types of databases, this disclosure contemplates any suitable types of databases. Particular embodiments may provide interfaces that enable a client system 730, a social-networking system 760, or a third-party system 770 to manage, retrieve, modify, add, or delete, the information stored in data store 764.

In particular embodiments, social-networking system 760 may store one or more social graphs in one or more data stores 764. In particular embodiments, a social graph may include multiple nodes—which may include multiple user nodes (each corresponding to a particular user) or multiple concept nodes (each corresponding to a particular concept)—and multiple edges connecting the nodes. Social-networking system 760 may provide users of the online social network the ability to communicate and interact with other users. In particular embodiments, users may join the online social network via social-networking system 760 and then add connections (e.g., relationships) to a number of other users of social-networking system 760 to whom they want to be connected. Herein, the term "friend" may refer to any other user of social-networking system 760 with whom a user has formed a connection, association, or relationship via social-networking system 760.

In particular embodiments, social-networking system 760 may provide users with the ability to take actions on various types of items or objects, supported by social-networking system 760. As an example and not by way of limitation, the items and objects may include groups or social networks to which users of social-networking system 760 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 760 or by an external system of third-party system 770, which is separate from social-networking system 760 and coupled to social-networking system 760 via a network 710.

In particular embodiments, social-networking system 760 may be capable of linking a variety of entities. As an example and not by way of limitation, social-networking system 760 may enable users to interact with each other as well as receive content from third-party systems 770 or other entities, or to allow users to interact with these entities through an application programming interfaces (API) or other communication channels.

In particular embodiments, a third-party system 770 may include one or more types of servers, one or more data stores, one or more interfaces, including but not limited to APIs, one or more web services, one or more content sources, one or more networks, or any other suitable components, e.g., that servers may communicate with. A third-party system 770 may be operated by a different entity from an entity operating social-networking system 760. In particular embodiments, however, social-networking system 760 and third-party systems 770 may operate in conjunction with each other to provide social-networking services to users of social-networking system 760 or third-party systems 770. In this sense, social-networking system 760 may provide a platform, or backbone, which other systems, such as third-party systems 770, may use to provide social-networking services and functionality to users across the Internet.

In particular embodiments, a third-party system 770 may include a third-party content object provider. A third-party content object provider may include one or more sources of content objects, which may be communicated to a client system 730. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 760 also includes user-generated content objects, which may enhance a user's interactions with social-networking system 760. User-generated content may include anything a user can add, upload, send, or "post" to social-networking system 760. As an example and not by way of limitation, a user communicates posts to social-networking system 760 from a client system 730. Posts may include data such as status updates or other textual data, location information, photos, videos, links, music or other similar data or media. Content may also be added to social-networking system 760 by a third-party through a "communication channel," such as a newsfeed or stream.

In particular embodiments, social-networking system 760 may include a variety of servers, sub-systems, programs, modules, logs, and data stores. In particular embodiments, social-networking system 760 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 760 may also include suitable components such as network interfaces, security mechanisms, load balancers, failover servers, management-and-network-operations consoles, other suitable components, or any suitable combination thereof. In particular embodiments, social-networking system 760 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 760 to one or more client systems 730 or one or more third-party system 770 via network 710. The web server may include a mail server or other messaging functionality for receiving and routing messages between social-networking system 760 and one or more client systems 730. An API-request server may allow a third-party system 770 to access information from social-networking system 760 by calling one or more APIs. An action logger may be used to receive communications from a web server about a user's actions on or off social-networking system 760. In conjunction with the action log, a third-party-content-object log may be maintained of user exposures to third-party-content objects. A notification controller may provide information regarding content objects to a client system 730. Information may be pushed to a client system 730 as notifications, or information may be pulled from client system 730 responsive to a request received from client system 730. Authorization servers may be used to enforce one or more privacy settings of the users of social-networking system 760. A privacy setting of a user determines how particular information associated with a user can be shared. The authorization server may allow users to opt in to or opt out of having their actions logged by social-networking system 760 or shared with other systems (e.g., third-party system 770), such as, for example, by setting appropriate privacy settings. Third-party-content-object stores may be used to store content objects received from third parties, such as a third-party system 770. Location stores may be used for storing location information received from client systems 730 associated with users. Advertisement-pricing modules may combine social information, the current time, location information, or other suitable information to provide relevant advertisements, in the form of notifications, to a user.

Figure 8:
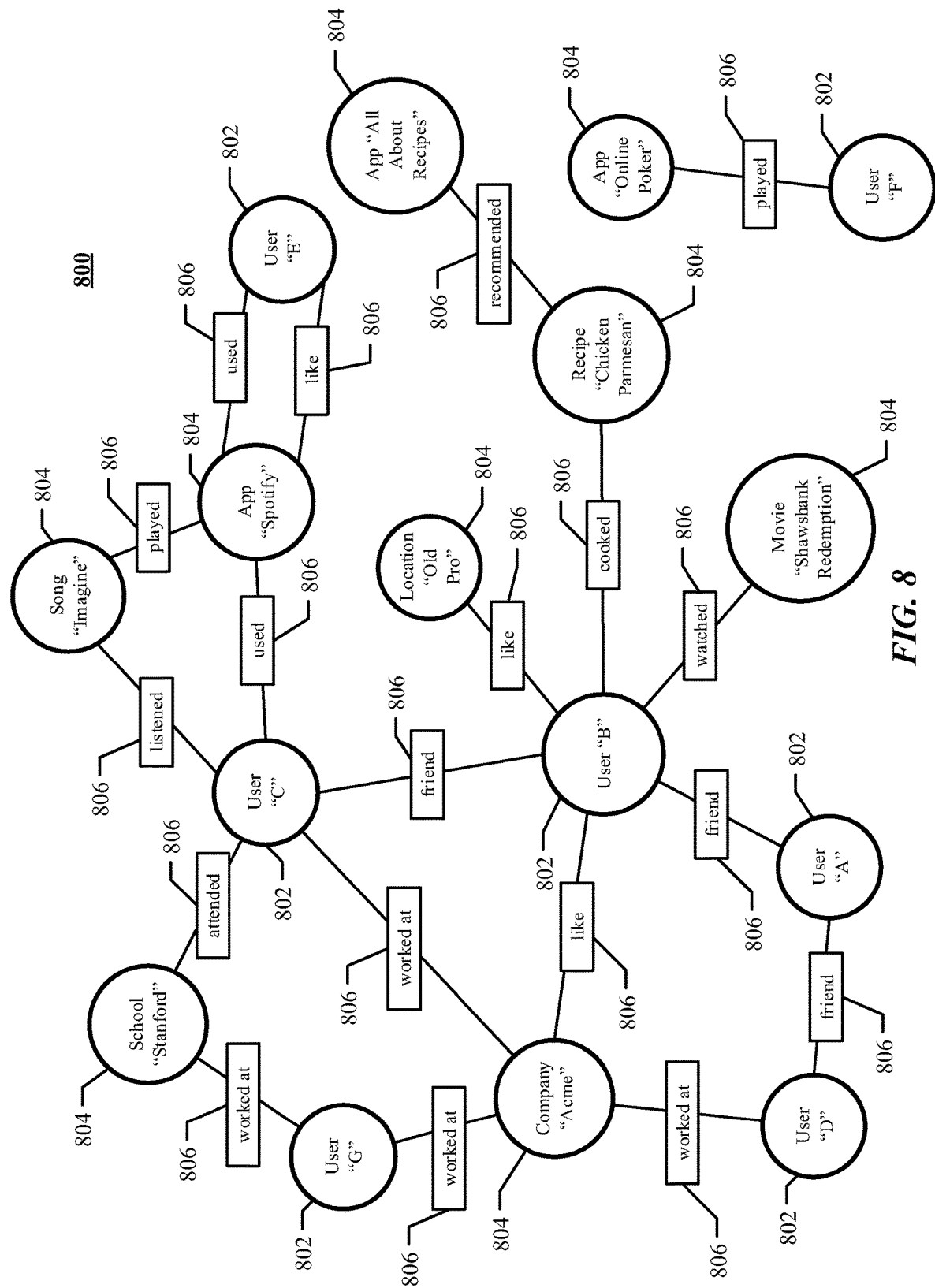
FIG. 8 illustrates an example social graph.

FIG. 8 illustrates example social graph 800. In particular embodiments, social-networking system 760 may store one or more social graphs 800 in one or more data stores. In particular embodiments, social graph 800 may include multiple nodes—which may include multiple user nodes 802 or multiple concept nodes 804—and multiple edges 806 connecting the nodes. Each node may be associated with a unique entity (i.e., user or concept), each of which may have a unique identifier (ID), such as a unique number or username. Example social graph 800 illustrated in FIG. 8 is shown, for didactic purposes, in a two-dimensional visual map representation. In particular embodiments, a social-networking system 760, client system 730, or third-party system 770 may access social graph 800 and related social-graph information for suitable applications. The nodes and edges of social graph 800 may be stored as data objects, for example, in a data store (such as a social-graph database). Such a data store may include one or more searchable or queryable indexes of nodes or edges of social graph 800.

In particular embodiments, a user node 802 may correspond to a user of social-networking system 760. As an example and not by way of limitation, a user may be an individual (human user), an entity (e.g., an enterprise, business, or third-party application), or a group (e.g., of individuals or entities) that interacts or communicates with or over social-networking system 760. In particular embodiments, when a user registers for an account with social-networking system 760, social-networking system 760 may create a user node 802 corresponding to the user, and store the user node 802 in one or more data stores. Users and user nodes 802 described herein may, where appropriate, refer to registered users and user nodes 802 associated with registered users. In addition or as an alternative, users and user nodes 802 described herein may, where appropriate, refer to users that have not registered with social-networking system 760. In particular embodiments, a user node 802 may be associated with information provided by a user or information gathered by various systems, including social-networking system 760. As an example and not by way of limitation, a user may provide his or her name, profile picture, contact information, birth date, sex, marital status, family status, employment, education background, preferences, interests, or other demographic information. In particular embodiments, a user node 802 may be associated with one or more data objects corresponding to information associated with a user. In particular embodiments, a user node 802 may correspond to one or more webpages.

In particular embodiments, a concept node 804 may correspond to a concept. As an example and not by way of limitation, a concept may correspond to a place (such as, for example, a movie theater, restaurant, landmark, or city); a website (such as, for example, a website associated with social-network system 760 or a third-party website associated with a web-application server); an entity (such as, for example, a person, business, group, sports team, or celebrity); a resource (such as, for example, an audio file, video file, digital photo, text file, structured document, or application) which may be located within social-networking system 760 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 804 may be associated with information of a concept provided by a user or information gathered by various systems, including social-networking system 760. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 804 may be associated with one or more data objects corresponding to information associated with concept node 804. In particular embodiments, a concept node 804 may correspond to one or more webpages.

In particular embodiments, a node in social graph 800 may represent or be represented by a webpage (which may be referred to as a "profile page"). Profile pages may be hosted by or accessible to social-networking system 760. Profile pages may also be hosted on third-party websites associated with a third-party system 770. As an example and not by way of limitation, a profile page corresponding to a particular external webpage may be the particular external webpage and the profile page may correspond to a particular concept node 804. Profile pages may be viewable by all or a selected subset of other users. As an example and not by way of limitation, a user node 802 may have a corresponding user-profile page in which the corresponding user may add content, make declarations, or otherwise express himself or herself. As another example and not by way of limitation, a concept node 804 may have a corresponding concept-profile page in which one or more users may add content, make declarations, or express themselves, particularly in relation to the concept corresponding to concept node 804.

In particular embodiments, a concept node 804 may represent a third-party webpage or resource hosted by a third-party system 770. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 730 to send to social-networking system 760 a message indicating the user's action. In response to the message, social-networking system 760 may create an edge (e.g., a check-in-type edge) between a user node 802 corresponding to the user and a concept node 804 corresponding to the third-party webpage or resource and store edge 806 in one or more data stores.

In particular embodiments, a pair of nodes in social graph 800 may be connected to each other by one or more edges 806. An edge 806 connecting a pair of nodes may represent a relationship between the pair of nodes. In particular embodiments, an edge 806 may include or represent one or more data objects or attributes corresponding to the relationship between a pair of nodes. As an example and not by way of limitation, a first user may indicate that a second user is a "friend" of the first user. In response to this indication, social-networking system 760 may send a "friend request" to the second user. If the second user confirms the "friend request," social-networking system 760 may create an edge 806 connecting the first user's user node 802 to the second user's user node 802 in social graph 800 and store edge 806 as social-graph information in one or more of data stores 764. In the example of FIG. 8, social graph 800 includes an edge 806 indicating a friend relation between user nodes 802 of user "A" and user "B" and an edge indicating a friend relation between user nodes 802 of user "C" and user "B." Although this disclosure describes or illustrates particular edges 806 with particular attributes connecting particular user nodes 802, this disclosure contemplates any suitable edges 806 with any suitable attributes connecting user nodes 802. As an example and not by way of limitation, an edge 806 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 800 by one or more edges 806. The degree of separation between two objects represented by two nodes, respectively, is a count of edges in a shortest path connecting the two nodes in the social graph 800. As an example and not by way of limitation, in the social graph 800, the user node 802 of user "C" is connected to the user node 802 of user "A" via multiple paths including, for example, a first path directly passing through the user node 802 of user "B," a second path passing through the concept node 804 of company "Acme" and the user node 802 of user "D," and a third path passing through the user nodes 802 and concept nodes 804 representing school "Stanford," user "G," company "Acme," and user "D." User "C" and user "A" have a degree of separation of two because the shortest path connecting their corresponding nodes (i.e., the first path) includes two edges 806.

In particular embodiments, an edge 806 between a user node 802 and a concept node 804 may represent a particular action or activity performed by a user associated with user node 802 toward a concept associated with a concept node 804. As an example and not by way of limitation, as illustrated in FIG. 8, a user may "like," "attended," "played," "listened," "cooked," "worked at," or "watched" a concept, each of which may correspond to an edge type or subtype. A concept-profile page corresponding to a concept node 804 may include, for example, a selectable "check in" icon (such as, for example, a clickable "check in" icon) or a selectable "add to favorites" icon. Similarly, after a user clicks these icons, social-networking system 760 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 760 may create a "listened" edge 806 and a "used" edge (as illustrated in FIG. 8) between user nodes 802 corresponding to the user and concept nodes 804 corresponding to the song and application to indicate that the user listened to the song and used the application. Moreover, social-networking system 760 may create a "played" edge 806 (as illustrated in FIG. 8) between concept nodes 804 corresponding to the song and the application to indicate that the particular song was played by the particular application. In this case, "played" edge 806 corresponds to an action performed by an external application (SPOTIFY) on an external audio file (the song "Imagine"). Although this disclosure describes particular edges 806 with particular attributes connecting user nodes 802 and concept nodes 804, this disclosure contemplates any suitable edges 806 with any suitable attributes connecting user nodes 802 and concept nodes 804. Moreover, although this disclosure describes edges between a user node 802 and a concept node 804 representing a single relationship, this disclosure contemplates edges between a user node 802 and a concept node 804 representing one or more relationships. As an example and not by way of limitation, an edge 806 may represent both that a user likes and has used at a particular concept. Alternatively, another edge 806 may represent each type of relationship (or multiples of a single relationship) between a user node 802 and a concept node 804 (as illustrated in FIG. 8 between user node 802 for user "E" and concept node 804 for "SPOTIFY").

In particular embodiments, social-networking system 760 may create an edge 806 between a user node 802 and a concept node 804 in social graph 800. As an example and not by way of limitation, a user viewing a concept-profile page (such as, for example, by using a web browser or a special-purpose application hosted by the user's client system 730) may indicate that he or she likes the concept represented by the concept node 804 by clicking or selecting a "Like" icon, which may cause the user's client system 730 to send to social-networking system 760 a message indicating the user's liking of the concept associated with the concept-profile page. In response to the message, social-networking system 760 may create an edge 806 between user node 802 associated with the user and concept node 804, as illustrated by "like" edge 806 between the user and concept node 804. In particular embodiments, social-networking system 760 may store an edge 806 in one or more data stores. In particular embodiments, an edge 806 may be automatically formed by social-networking system 760 in response to a particular user action. As an example and not by way of limitation, if a first user uploads a picture, watches a movie, or listens to a song, an edge 806 may be formed between user node 802 corresponding to the first user and concept nodes 804 corresponding to those concepts. Although this disclosure describes forming particular edges 806 in particular manners, this disclosure contemplates forming any suitable edges 806 in any suitable manner.

In particular embodiments, social-networking system 760 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 770 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 760 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 760 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 760 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 760 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 760 may calculate a coefficient based on a user's actions. Social-networking system 760 may monitor such actions on the online social network, on a third-party system 770, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 760 may calculate a coefficient based on the user's actions with particular types of content. The content may be associated with the online social network, a third-party system 770, or another suitable system. The content may include users, profile pages, posts, news stories, headlines, instant messages, chat room conversations, emails, advertisements, pictures, video, music, other suitable objects, or any combination thereof. Social-networking system 760 may analyze a user's actions to determine whether one or more of the actions indicate an affinity for subject matter, content, other users, and so forth. As an example and not by way of limitation, if a user frequently posts content related to "coffee" or variants thereof, social-networking system 760 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 760 may calculate a coefficient based on the type of relationship between particular objects. Referencing the social graph 800, social-networking system 760 may analyze the number and/or type of edges 806 connecting particular user nodes 802 and concept nodes 804 when calculating a coefficient. As an example and not by way of limitation, user nodes 802 that are connected by a spouse-type edge (representing that the two users are married) may be assigned a higher coefficient than a user node 802 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 760 may determine that the user has a higher coefficient with respect to the first photo than the second photo because having a tagged-in-type relationship with content may be assigned a higher weight and/or rating than having a like-type relationship with content. In particular embodiments, social-networking system 760 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 760 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 800. As an example and not by way of limitation, social-graph entities that are closer in the social graph 800 (i.e., fewer degrees of separation) may have a higher coefficient than entities that are further apart in the social graph 800.

In particular embodiments, social-networking system 760 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 730 of the user). A first user may be more interested in other users or concepts that are closer to the first user. As an example and not by way of limitation, if a user is one mile from an airport and two miles from a gas station, social-networking system 760 may determine that the user has a higher coefficient for the airport than the gas station based on the proximity of the airport to the user.

In particular embodiments, social-networking system 760 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 760 may provide information that is relevant to user's interests and current circumstances, increasing the likelihood that they will find such information of interest. In particular embodiments, social-networking system 760 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 760 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 760 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 770 (e.g., via an API or other communication channel), or from another suitable system. In response to the request, social-networking system 760 may calculate the coefficient (or access the coefficient information if it has previously been calculated and stored). In particular embodiments, social-networking system 760 may measure an affinity with respect to a particular process. Different processes (both internal and external to the online social network) may request a coefficient for a particular object or set of objects. Social-networking system 760 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more objects (e.g., content or other types of objects) of a computing system may be associated with one or more privacy settings. The one or more objects may be stored on or otherwise associated with any suitable computing system or application, such as, for example, a social-networking system 760, a client system 730, a third-party system 770, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photo albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 804 corresponding to a particular photo may have a privacy setting specifying that the photo may be accessed only by users tagged in the photo and friends of the users tagged in the photo. In particular embodiments, privacy settings may allow users to opt in to or opt out of having their content, information, or actions stored/logged by the social-networking system 760 or shared with other systems (e.g., a third-party system 770). Although this disclosure describes using particular privacy settings in a particular manner, this disclosure contemplates using any suitable privacy settings in any suitable manner.

In particular embodiments, privacy settings may be based on one or more nodes or edges of a social graph 800. A privacy setting may be specified for one or more edges 806 or edge-types of the social graph 800, or with respect to one or more nodes 802, 804 or node-types of the social graph 800. The privacy settings applied to a particular edge 806 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 760. The object may be associated with a concept node 804 connected to a user node 802 of the first user by an edge 806. The first user may specify privacy settings that apply to a particular edge 806 connecting to the concept node 804 of the object, or may specify privacy settings that apply to all edges 806 connecting to the concept node 804. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

In particular embodiments, the social-networking system 760 may present a "privacy wizard" (e.g., within a webpage, a module, one or more dialog boxes, or any other suitable interface) to the first user to assist the first user in specifying one or more privacy settings. The privacy wizard may display instructions, suitable privacy-related information, current privacy settings, one or more input fields for accepting one or more inputs from the first user specifying a change or confirmation of privacy settings, or any suitable combination thereof. In particular embodiments, the social-networking system 760 may offer a "dashboard" functionality to the first user that may display, to the first user, current privacy settings of the first user. The dashboard functionality may be displayed to the first user at any appropriate time (e.g., following an input from the first user summoning the dashboard functionality, following the occurrence of a particular event or trigger action). The dashboard functionality may allow the first user to modify one or more of the first user's current privacy settings at any time, in any suitable manner (e.g., redirecting the first user to the privacy wizard).

Privacy settings associated with an object may specify any suitable granularity of permitted access or denial of access. As an example and not by way of limitation, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems 770, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular embodiments, one or more servers 762 may be authorization/privacy servers for enforcing privacy settings. In response to a request from a user (or other entity) for a particular object stored in a data store 764, the social-networking system 760 may send a request to the data store 764 for the object. The request may identify the user associated with the request and the object may be sent only to the user (or a client system 730 of the user) if the authorization server determines that the user is authorized to access the object based on the privacy settings associated with the object. If the requesting user is not authorized to access the object, the authorization server may prevent the requested object from being retrieved from the data store 764 or may prevent the requested object from being sent to the user. In the search-query context, an object may be provided as a search result only if the querying user is authorized to access the object, e.g., if the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on the social-networking system 760, or other computing system. As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users who attend the same university as the first user may view the first user's pictures, but that other users who are family members of the first user may not view those same pictures.

In particular embodiments, the social-networking system 760 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, privacy settings may allow a first user to specify (e.g., by opting out, by not opting in) whether the social-networking system 760 may receive, collect, log, or store particular objects or information associated with the user for any purpose. In particular embodiments, privacy settings may allow the first user to specify whether particular applications or processes may access, store, or use particular objects or information associated with the user. The privacy settings may allow the first user to opt in or opt out of having objects or information accessed, stored, or used by specific applications or processes. The social-networking system 760 may access such information in order to provide a particular function or service to the first user, without the social-networking system 760 having access to that information for any other purposes. Before accessing, storing, or using such objects or information, the social-networking system 760 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 760.

In particular embodiments, a user may specify whether particular types of objects or information associated with the first user may be accessed, stored, or used by the social-networking system 760. As an example and not by way of limitation, the first user may specify that images sent by the first user through the social-networking system 760 may not be stored by the social-networking system 760. As another example and not by way of limitation, a first user may specify that messages sent from the first user to a particular second user may not be stored by the social-networking system 760. As yet another example and not by way of limitation, a first user may specify that all objects sent via a particular application may be saved by the social-networking system 760.

In particular embodiments, privacy settings may allow a first user to specify whether particular objects or information associated with the first user may be accessed from particular client systems 730 or third-party systems 770. The privacy settings may allow the first user to opt in or opt out of having objects or information accessed from a particular device (e.g., the phone book on a user's smart phone), from a particular application (e.g., a messaging app), or from a particular system (e.g., an email server). The social-networking system 760 may provide default privacy settings with respect to each device, system, or application, and/or the first user may be prompted to specify a particular privacy setting for each context. As an example and not by way of limitation, the first user may utilize a location-services feature of the social-networking system 760 to provide recommendations for restaurants or other places in proximity to the user. The first user's default privacy settings may specify that the social-networking system 760 may use location information provided from a client device 730 of the first user to provide the location-based services, but that the social-networking system 760 may not store the location information of the first user or provide it to any third-party system 770. The first user may then update the privacy settings to allow location information to be used by a third-party image-sharing application in order to geo-tag photos.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 760 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, the social-networking system 760 may use a user's previous activities and calculated moods or sentiments to determine a present mood or sentiment. A user who wishes to enable this functionality may indicate in their privacy settings that they opt in to the social-networking system 760 receiving the inputs necessary to determine the mood or sentiment. As an example and not by way of limitation, the social-networking system 760 may determine that a default privacy setting is to not receive any information necessary for determining mood or sentiment until there is an express indication from a user that the social-networking system 760 may do so. By contrast, if a user does not opt in to the social-networking system 760 receiving these inputs (or affirmatively opts out of the social-networking system 760 receiving these inputs), the social-networking system 760 may be prevented from receiving, collecting, logging, or storing these inputs or any information associated with these inputs. In particular embodiments, the social-networking system 760 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, the social-networking system 760 may use the user's mood or sentiment to provide newsfeed items, pages, friends, or advertisements to a user. The user may specify in their privacy settings that the social-networking system 760 may determine the user's mood or sentiment. The user may then be asked to provide additional privacy settings to indicate the purposes for which the user's mood or sentiment may be used. The user may indicate that the social-networking system 760 may use his or her mood or sentiment to provide newsfeed content and recommend pages, but not for recommending friends or advertisements. The social-networking system 760 may then only provide newsfeed content or pages based on user mood or sentiment, and may not use that information for any other purpose, even if not expressly prohibited by the privacy settings.

In particular embodiments, privacy settings may allow a user to specify one or more geographic locations from which objects can be accessed. Access or denial of access to the objects may depend on the geographic location of a user who is attempting to access the objects. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user.

In particular embodiments, the social-networking system 760 may have functionalities that may use, as inputs, personal or biometric information of a user for user-authentication or experience-personalization purposes. A user may opt to make use of these functionalities to enhance their experience on the online social network. As an example and not by way of limitation, a user may provide personal or biometric information to the social-networking system 760. The user's privacy settings may specify that such information may be used only for particular processes, such as authentication, and further specify that such information may not be shared with any third-party system 770 or used for other processes or applications associated with the social-networking system 760. As another example and not by way of limitation, the social-networking system 760 may provide a functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to authenticate the user, to send voice messages, to improve voice recognition in order to use voice-operated features of the online social network), and further specify that such voice recording may not be shared with any third-party system 770 or used by other processes or applications associated with the social-networking system 760. As another example and not by way of limitation, the social-networking system 760 may provide a functionality for a user to provide a reference image (e.g., a facial profile, a retinal scan) to the online social network. The online social network may compare the reference image against a later-received image input (e.g., to authenticate the user, to tag the user in photos). The user's privacy setting may specify that such voice recording may be used only for a limited purpose (e.g., authentication, tagging the user in photos), and further specify that such voice recording may not be shared with any third-party system 770 or used by other processes or applications associated with the social-networking system 760.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 760 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 760 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, the social-networking system 760 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 760 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing a particular privacy setting, a prompt may be presented to the user to remind the user of his or her current privacy settings and to ask the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 760 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 760 may prompt the user with a reminder of the user's current privacy settings of posts being visible only to friends, and a warning that this change will make all of the user's past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 760 may send a reminder to the user to confirm his or her privacy settings every six months or after every ten photo posts. In particular embodiments, privacy settings may also allow users to control access to the objects or information on a per-request basis. As an example and not by way of limitation, the social-networking system 760 may notify the user whenever a third-party system 770 attempts to access information associated with the user, and require the user to provide verification that access should be allowed before proceeding.

Figure 9:
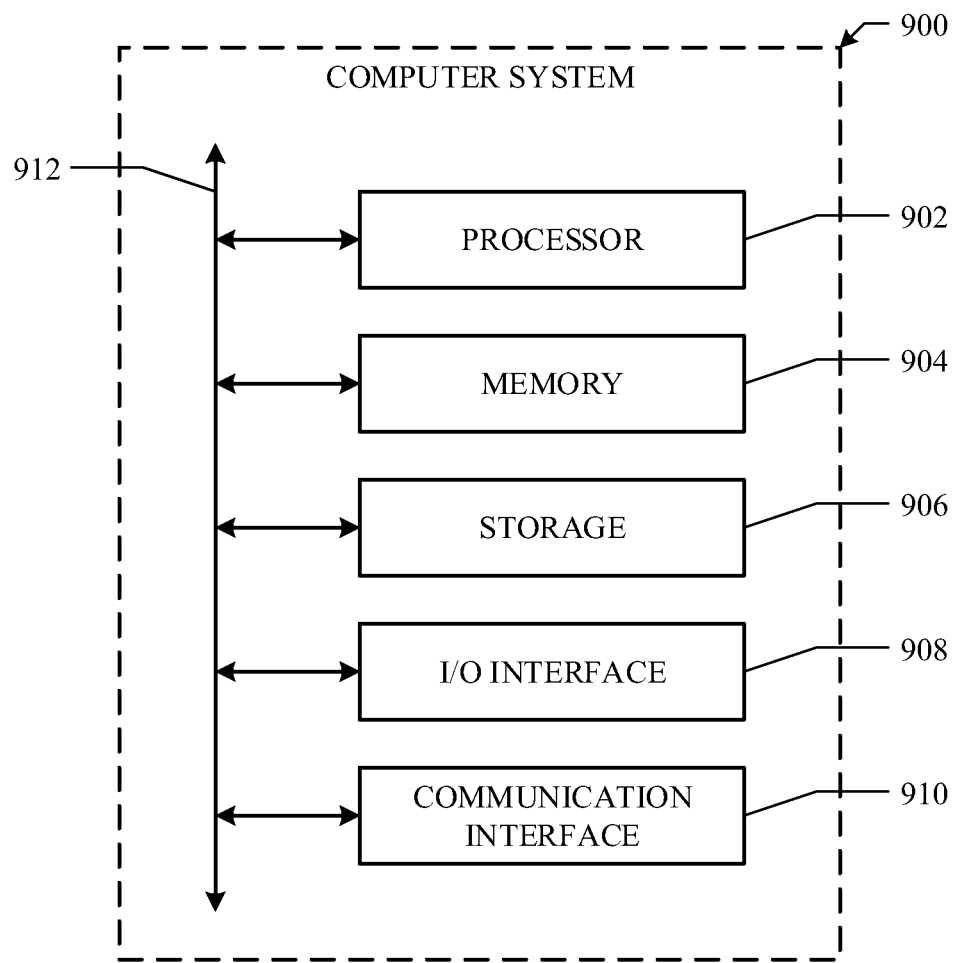
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a Wi-Fi network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a Wi-Fi network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, retrieving a media content item for display to a user in an environment;
    by the computing device, receiving, from one or more interaction devices each comprising a projector and a camera, one or more media objects captured by one or more cameras, wherein one or more of the media objects comprise images of the user;
    by the computing device, determining a location of the user in the environment based on an analysis of the one or more of the media objects;
    by the computing device, identifying a plurality of projectable surfaces in the environment based on the analysis of the one or more of the media objects, wherein the media content item is to be projected to one of the plurality of projectable surfaces;
    by the computing device, selecting a projectable surface among the plurality of projectable surfaces based on one or more characteristics associated with the media content item and the determined location of the user;
    by the computing device, identifying one of the one or more interaction devices based on the selected projectable surface; and
    by the computing device, sending, to the identified interaction device, the media content item and instructions causing the projector associated with the identified interaction device to project the media content item on the selected projectable surface.

2. The method of claim 1, wherein identifying the plurality of projectable surfaces comprises identifying the plurality of projectable surfaces based at least in part on the determined location of the user.

3. The method of claim 1, wherein identifying the plurality of projectable surfaces comprises identifying the plurality of projectable surfaces based at least in part on one or more characteristics associated with the media content item.

4. The method of claim 1, wherein identifying the plurality of projectable surfaces comprises identifying the plurality of projectable surfaces that the user is facing.

5. The method of claim 1, wherein each of the one or more of interaction devices comprises an audio sensor, further comprising:
   receiving, from each of the one or more interaction devices, audio signals collected by the audio sensor associated with the interaction device;
   extracting one or more features associated with a scene-understanding model based on an analysis of the received audio signals and media objects;
   assigning a scene category to the environment based at least in part on the one or more features; and
   wherein the interaction device is identified further based on the scene category.

6. The method of claim 1, further comprising:
   sending, to the identified interaction device, instructions causing the projector associated with the identified interaction device to project the media content item on a tangible object at a first location;
   receiving, from the one or more interaction devices, one or more additional media objects captured by the cameras, wherein the one or more additional media objects comprise images of the tangible object;
   determining, based on the one or more additional media objects, that the tangible object has moved from the first location to a second location; and
   sending, to a different interaction device, instructions causing the projector associated with the different interaction device to project the media content item on the tangible object at the second location.

7. The method of claim 1, further comprising:
   receiving, from the one or more interaction devices, one or more additional media objects captured by the cameras, wherein the one or more additional media objects comprise images of the user;
   determining, based on the one or more additional media objects, that the user has moved to a new location; and
   sending, to a different interaction device in proximity to the new location, instructions causing the projector associated with the different interaction device to project the media content item.

8. The method of claim 1, further comprising:
   identifying a gesture of the user based on the one or more media objects, wherein the interaction device is identified based at least in part on the gesture of the user.

9. One or more computer-readable non-transitory storage media embodying software that is operable when executed to:
   retrieve a media content item for display to a user in an environment;
   receive, from one or more interaction devices each comprising a projector and a camera, one or more media objects captured by one or more cameras, wherein one or more of the media objects comprise images of the user;
   determine a location of the user in the environment based on an analysis of the one or more of the media objects;
   identify a plurality of projectable surfaces in the environment based on the analysis of the one or more of the media objects, wherein the media content item is to be projected to one of the plurality of projectable surfaces;
   select a projectable surface among the plurality of projectable surfaces based on one or more characteristics associated with the media content item and the determined location of the user;
   identify one of the one or more interaction devices based on the selected projectable surface; and
   send, to the identified interaction device, the media content item and instructions causing the projector associated with the identified interaction device to project the media content item on the selected projectable surface.

10. The media of claim 9, wherein identifying the plurality of projectable surfaces comprises identifying the plurality of projectable surfaces based at least in part on the determined location of the user.

11. The media of claim 9, wherein identifying the plurality of projectable surfaces comprises identifying the plurality of projectable surfaces based at least in part on one or more characteristics associated with the media content item.

12. The media of claim 9, wherein identifying the plurality of projectable surfaces comprises identifying the plurality of projectable surfaces that the user is facing.

13. The media of claim 9, wherein each of the one or more of interaction devices comprises an audio sensor, and wherein the software is further operable when executed to:
   receive, from each of the one or more interaction devices, audio signals collected by the audio sensor associated with the interaction device;
   extract one or more features associated with a scene-understanding model based on an analysis of the received audio signals and media objects;
   assign a scene category to the environment based at least in part on the one or more features; and
   wherein the interaction device is identified further based on the scene category.

14. The media of claim 9, wherein the software is further operable when executed to:
   send, to the identified interaction device, instructions causing the projector associated with the identified interaction device to project the media content item on a tangible object at a first location;
   receive, from the one or more interaction devices, one or more additional media objects captured by the cameras, wherein the one or more additional media objects comprise images of the tangible object;
   determine, based on the one or more additional media objects, that the tangible object has moved from the first location to a second location; and
   send, to a different interaction device, instructions causing the projector associated with the different interaction device to project the media content item on the tangible object at the second location.

15. The media of claim 9, wherein the software is further operable when executed to:
   receive, from the one or more interaction devices, one or more additional media objects captured by the cameras, wherein the one or more additional media objects comprise images of the user;
   determine, based on the one or more additional media objects, that the user has moved to a new location; and send, to a different interaction device in proximity to the new location, instructions causing the projector associated with the different interaction device to project the media content item.

16. The media of claim 9, wherein the software is further operable when executed to:
identify a gesture of the user based on the one or more media objects, wherein the interaction device is identified based at least in part on the gesture of the user.

17. A system comprising:
one or more processors; and
one or more computer-readable non-transitory storage media coupled to one or more of the processors and comprising instructions operable when executed by one or more of the processors to cause the system to:
retrieve a media content item for display to a user in an environment;
receive, from one or more interaction devices each comprising a projector and a camera, one or more media objects captured by one or more cameras, wherein one or more of the media objects comprise images of the user;
determine a location of the user in the environment based on an analysis of the one or more of the media objects;
identify a plurality of projectable surfaces in the environment based on the analysis of the one or more of the media objects, wherein the media content item is to be projected to one of the plurality of projectable surfaces;
select a projectable surface among the plurality of projectable surfaces based on one or more characteristics associated with the media content item and the determined location of the user;
identify one of the one or more interaction devices based on the selected projectable surface; and
send, to the identified interaction device, the media content item and instructions causing the projector associated with the identified interaction device to project the media content item on the selected projectable surface.

18. The system of claim 17, wherein identifying the plurality of projectable surfaces comprises identifying the plurality of projectable surface based at least in part on the determined location of the user.

19. The system of claim 17, wherein identifying the plurality of projectable surfaces comprises identifying the plurality of projectable surface based at least in part on one or more characteristics associated with the media content item; and
send, to the identified interaction device, instructions causing the projector associated with the identified interaction device to project the media content item on the identified projectable surface.

20. The system of claim 17, wherein identifying the plurality of projectable surfaces comprises identifying the plurality of projectable surfaces that the user is facing.

* * * * *